United States Patent
Bae et al.

(10) Patent No.: US 12,267,815 B2
(45) Date of Patent: Apr. 1, 2025

(54) METHOD, USER EQUIPMENT, DEVICE AND STORAGE MEDIUM FOR PERFORMING UPLINK TRANSMISSION AND METHOD AND BASE STATION FOR PERFORMING UPLINK RECEPTION

(71) Applicant: LG Electronics Inc., Seoul (KR)

(72) Inventors: Duckhyun Bae, Seoul (KR); Hyunho Lee, Seoul (KR); Changhwan Park, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 17/428,176

(22) PCT Filed: Feb. 14, 2020

(86) PCT No.: PCT/KR2020/002091
§ 371 (c)(1),
(2) Date: Aug. 3, 2021

(87) PCT Pub. No.: WO2020/167014
PCT Pub. Date: Aug. 20, 2020

(65) Prior Publication Data
US 2022/0124707 A1    Apr. 21, 2022

(30) Foreign Application Priority Data

Feb. 15, 2019  (KR) .................. 10-2019-0017949
Mar. 29, 2019  (KR) .................. 10-2019-0037141
Aug. 16, 2019  (KR) .................. 10-2019-0100605

(51) Int. Cl.
*H04W 72/0446*    (2023.01)
(52) U.S. Cl.
CPC ...................... *H04W 72/0446* (2013.01)

(58) Field of Classification Search
CPC ............ H04W 72/0446; H04W 72/23; H04W 74/0833
(Continued)

(56) References Cited

U.S. PATENT DOCUMENTS 10,419,162 B2 *  9/2019  Hakola ................. H04L 1/1854
11,503,608 B2 * 11/2022  Shen ................. H04W 72/0446
(Continued)

FOREIGN PATENT DOCUMENTS

CN    104641582    5/2015
CN    104685802    6/2015
(Continued)

OTHER PUBLICATIONS

Ericsson, "PUSCH Enhancements for NR URLLC," R1-1813968, Presented at 3GPP TSG-RAN WG1 Meeting #95, Spokane, USA, Nov. 12-16, 2018, 8 pages.
(Continued)

*Primary Examiner* — Thuong Nguyen
(74) *Attorney, Agent, or Firm* — Fish & Richardson P.C.

(57) ABSTRACT

Provided are a method, a user equipment, a device and a recording medium in which: resource allocation information associated with a plurality of symbols is received; symbols which cannot be used for uplink transmission among the plurality of symbols are determined on the basis of the resource allocation information; and the uplink transmission is performed in at least one of the remaining symbols from the plurality of symbols excluding the symbols which cannot be used. The symbols which cannot be used comprise a symbol (DL symbol) in which a slot format is instructed as downlink (DL) and K non-DL symbols immediately after the DL symbol among the plurality of symbols. Each of the K non-DL symbols is a symbol in which a slot format is not instructed as DL, and K is an integer greater than 0.

5 Claims, 16 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2007/0036067 | A1* | 2/2007 | Zhang | H04L 27/2602 370/208 |
| 2009/0252079 | A1* | 10/2009 | Zhang | H04B 7/14 370/315 |
| 2009/0268689 | A1* | 10/2009 | Fu | H04W 36/0085 370/331 |
| 2011/0206024 | A1* | 8/2011 | Lee | H04L 1/0027 370/338 |
| 2013/0070635 | A1* | 3/2013 | Suo | H04W 52/0206 370/252 |
| 2013/0195006 | A1* | 8/2013 | Kim | H04L 1/0083 370/329 |
| 2015/0188680 | A1* | 7/2015 | Li | H04W 28/0278 370/329 |
| 2015/0282143 | A1* | 10/2015 | Kim | H04W 74/0833 370/329 |
| 2015/0358133 | A1* | 12/2015 | Kusashima | H04L 5/14 370/280 |
| 2016/0183248 | A1* | 6/2016 | Niu | H04L 27/2647 370/329 |
| 2016/0192369 | A1* | 6/2016 | Suzuki | H04W 52/20 370/329 |
| 2017/0238312 | A1* | 8/2017 | Chen | H04L 1/1812 370/329 |
| 2018/0097679 | A1* | 4/2018 | Zhang | H04L 27/2607 |
| 2018/0242243 | A1* | 8/2018 | Kela | H04L 5/0057 |
| 2018/0302915 | A1* | 10/2018 | Einhaus | H04W 16/14 |
| 2019/0052432 | A1* | 2/2019 | Islam | H04L 5/0053 |
| 2019/0053227 | A1 | 2/2019 | Huang et al. | |
| 2019/0090126 | A1* | 3/2019 | Hayashi | H04W 74/02 |
| 2019/0239248 | A1* | 8/2019 | Zhang | H04W 76/11 |
| 2019/0394799 | A1* | 12/2019 | Islam | H04W 56/001 |
| 2020/0053624 | A1* | 2/2020 | Braithwaite | H04W 84/047 |
| 2020/0214006 | A1* | 7/2020 | Choi | H04L 5/0048 |
| 2020/0275431 | A1* | 8/2020 | Bae | H04W 72/04 |
| 2020/0314840 | A1* | 10/2020 | Golitschek Edler Von Elbwart | H04L 5/0044 |
| 2020/0336255 | A1* | 10/2020 | Wong | H04W 72/0446 |
| 2020/0344755 | A1* | 10/2020 | Shen | H04W 72/0446 |
| 2021/0022117 | A1* | 1/2021 | Yi | H04L 5/0044 |
| 2021/0258980 | A1* | 8/2021 | Luo | H04W 28/0268 |
| 2022/0046615 | A1* | 2/2022 | Park | H04L 5/0053 |
| 2022/0086872 | A1* | 3/2022 | Shimezawa | H04W 72/1268 |
| 2022/0124707 | A1* | 4/2022 | Bae | H04W 72/0446 |
| 2022/0131648 | A1* | 4/2022 | El Hamss | H04W 74/0816 |
| 2022/0132533 | A1* | 4/2022 | Taherzadeh Boroujeni | H04L 5/0092 |

FOREIGN PATENT DOCUMENTS

| | | |
|---|---|---|
| EP | 2982071 | 2/2016 |
| WO | WO 2018/030812 | 2/2018 |
| WO | WO2019029741 | 2/2019 |

OTHER PUBLICATIONS

International Search Report and Written Opinion in International Appln. No. PCT/KR2020/002091, dated Jun. 9, 2020, 15 pages (with English translation).

Motorola Mobility & Lenovo, "PUSCH enhancement for URLLC," R1-1813354, Presented at 3GPP TSG RAN WG1 Meeting #95, Spokane, Washington, USA, Nov. 12-16, 2018, 2 pages.

NTT Docomo, Inc., "Enhancements for URLLC PUSCH," R1-1813326, 3GPP TSG RAN WG1 Meeting #95, Spokane, USA, Nov. 12-16, 2018, 6 pages.

Spreadtrum Communications, "Discussion on URLLC PUSCH enhancements," R1-1813068, Presented at 3GPP TSG RAN WG1 Meeting #95, Spokane, USA, Nov. 12-16, 2018, 3 pages.

CATT, "Outstanding aspects of slot format indication," R1-1715815, Presented at 3GPP TSG RAN WG1 Meeting AH #NR3, Nagoya, Japan, Sep. 18-21, 2017, 10 pages.

Extended European Search Report in European Appln. No. 20756315.6, dated Feb. 15, 2022, 14 pages.

LG Electronics, "Discussion on group common PDCCH," R1-1800373, Presented at 3GPP TSG RAN WG1 NR AH1801, Vancouver, Canada Jan. 22-26, 2018, 15 pages.

Samsung, "PUSCH enhancement for URLLC," R1-1901068, Presented at 3GPP TSG RAN WG1 Ad-Hoc Meeting 1901, Taipei, Taiwan, Jan. 21-25, 2019, 4 pages.

ZTE, "Enhancement for UL grant-free transmissions," R1-1813884, Presented at 3GPP TSG RAN WG1 Meeting #95, Spokane, USA, Nov. 12-16, 2018, 9 pages.

Notice of Allowance in Chinese Appln. No. 202080013680.4, mailed on Jun. 25, 2023, 14 pages (with English translation).

* cited by examiner

FIG. 5
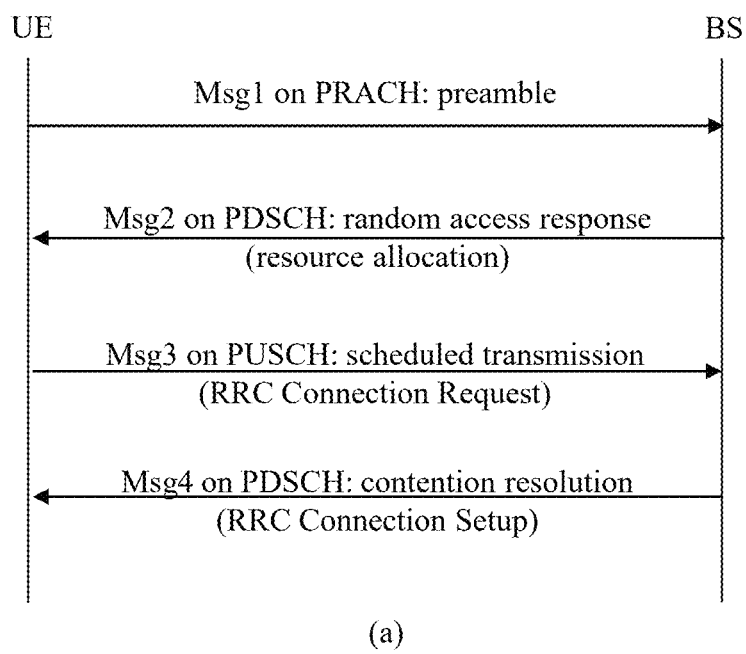
(a)
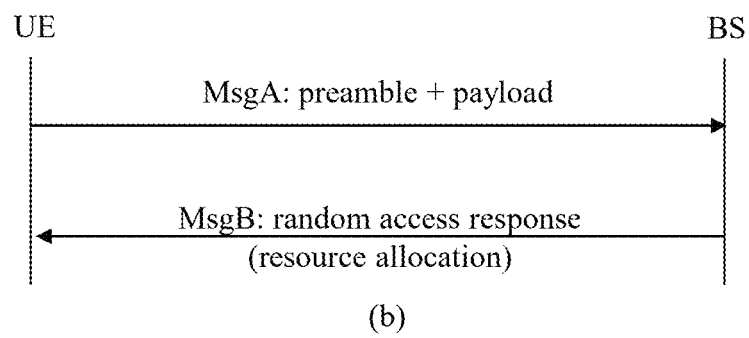
(b)

METHOD, USER EQUIPMENT, DEVICE AND STORAGE MEDIUM FOR PERFORMING UPLINK TRANSMISSION AND METHOD AND BASE STATION FOR PERFORMING UPLINK RECEPTION

CROSS-REFERENCE TO RELATED APPLICATIONS

This application is a National Stage application under 35 U.S.C. § 371 of International Application No. PCT/KR2020/002091, filed on Feb. 14, 2020, which claims the benefit of Korean Application Nos. 10-2019-0100605, filed on Aug. 16, 2019, 10-2019-0037141, filed on Mar. 29, 2019, and 10-2019-0017949, filed on Feb. 15, 2019. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

According to an aspect of the present disclosure, a method of performing an uplink transmission by a user equipment (UE) in a wireless communication system is provided. The method includes receiving resource allocation information related to a plurality of symbols, determining unavailable symbols for the uplink transmission from among the plurality of symbols based on the resource allocation information, and performing the uplink transmission in at least one of remaining symbols except for the unavailable symbols among the plurality of symbols. The unavailable symbols include a symbol with a slot format indicated as downlink (DL) (DL symbol) and K non-DL symbols following the DL symbol, each of the K non-DL symbols is a symbol with a slot format not indicated as DL, and K is an integer larger than 0.

According to another aspect of the present disclosure, a UE for performing an uplink transmission in a wireless communication system is provided. The UE includes at least one transceiver, at least one processor, and at least one computer memory operatively coupled to the at least one processor and storing instructions which when executed, cause the at least one processor to perform operations. The operations include receiving a resource allocation, receiving resource allocation information related to a plurality of symbols, determining unavailable symbols for the uplink transmission from among the plurality of symbols based on the resource allocation information, and performing the uplink transmission in at least one of remaining symbols except for the unavailable symbols among the plurality of symbols. The unavailable symbols include a symbol with a slot format indicated as DL (DL symbol) and K non-DL symbols following the DL symbol, each of the K non-DL symbols is a symbol with a slot format not indicated as DL, and K is an integer larger than 0.

According to another aspect of the present disclosure, an apparatus for a UE is provided. The apparatus includes at least one processor, and at least one computer memory operatively coupled to the at least one processor and storing instructions which when executed, cause the at least one processor to perform operations. The operations include receiving resource allocation information related to a plurality of symbols, determining unavailable symbols for an uplink transmission from among the plurality of symbols based on the resource allocation information, and performing the uplink transmission in at least one of remaining symbols except for the unavailable symbols among the plurality of symbols. The unavailable symbols include a symbol with a slot format indicated as DL (DL symbol) and K non-DL symbols following the DL symbol, each of the K non-DL symbols is a symbol with a slot format not indicated as DL, and K is an integer larger than 0.

According to another aspect of the present disclosure, a computer-readable storage medium is provided. The computer-readable storage medium stores at least one program including instructions which when executed by at least one processor, cause the at least one processor to perform operations for a UE. The operations include receiving resource allocation information related to a plurality of symbols, determining unavailable symbols for an uplink transmission from among the plurality of symbols based on the resource allocation information, and performing the uplink transmission in at least one of remaining symbols except for the unavailable symbols among the plurality of symbols. The unavailable symbols include a symbol with a slot format indicated as DL (DL symbol) and K non-DL symbols following the DL symbol, each of the K non-DL symbols is a symbol with a slot format not indicated as DL, and K is an integer larger than 0.

According to another aspect of the present disclosure, a method of performing an uplink reception by a BS in a wireless communication system is provided. The method includes transmitting resource allocation information related to a plurality of symbols, determining unavailable symbols for the uplink reception from among the plurality of symbols based on the resource allocation information, and performing the uplink reception in at least one of remaining symbols except for the unavailable symbols among the plurality of symbols. The unavailable symbols include a symbol with a slot format indicated as DL (DL symbol) and K non-DL symbols following the DL symbol, each of the K non-DL symbols is a symbol with a slot format not indicated as DL, and K is an integer larger than 0.

According to another aspect of the present disclosure, a BS for performing an uplink reception in a wireless communication system is provided. The BS includes at least one processor, and at least one computer memory operatively coupled to the at least one processor and storing instructions which when executed, cause the at least one processor to perform operations. The operations include transmitting resource allocation information related to a plurality of symbols, determining unavailable symbols for the uplink reception from among the plurality of symbols based on the resource allocation information, and performing the uplink reception in at least one of remaining symbols except for the unavailable symbols among the plurality of symbols. The unavailable symbols include a symbol with a slot format indicated as DL (DL symbol) and K non-DL symbols following the DL symbol, each of the K non-DL symbols is a symbol with a slot format not indicated as DL, and K is an integer larger than 0.

According to each aspect of the present disclosure, K may be determined based on at least a timing advance value of the UE According to each aspect of the present disclosure, K may be determined based on at least a reception-to-transmission transition time of the UE.

According to each aspect of the present disclosure, the BS may provide information regarding K to the UE.

According to each aspect of the present disclosure, determining the unavailable symbols may include determining sets of contiguous non-DL symbols from among the plurality of symbols based on the slot format of each of the plurality of symbols.

According to each aspect of the present disclosure, the uplink transmission may be performed in a set of contiguous non-DL symbols other than a set of contiguous non-DL symbols including the K non-DL symbols.

According to each aspect of the present disclosure, the uplink transmission may be performed in remaining symbols except for the K non-DL symbols in a set of contiguous non-DL symbols including the K non-DL symbols.

The foregoing solutions are merely a part of the examples of the present disclosure and various examples into which the technical features of the present disclosure are incorporated may be derived and understood by persons skilled in the art from the following detailed description.

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure:

FIG. 5 is a diagram illustrating exemplary random access procedures applied to implementation(s) of the present disclosure;

DETAILED DESCRIPTION

Figure 1:
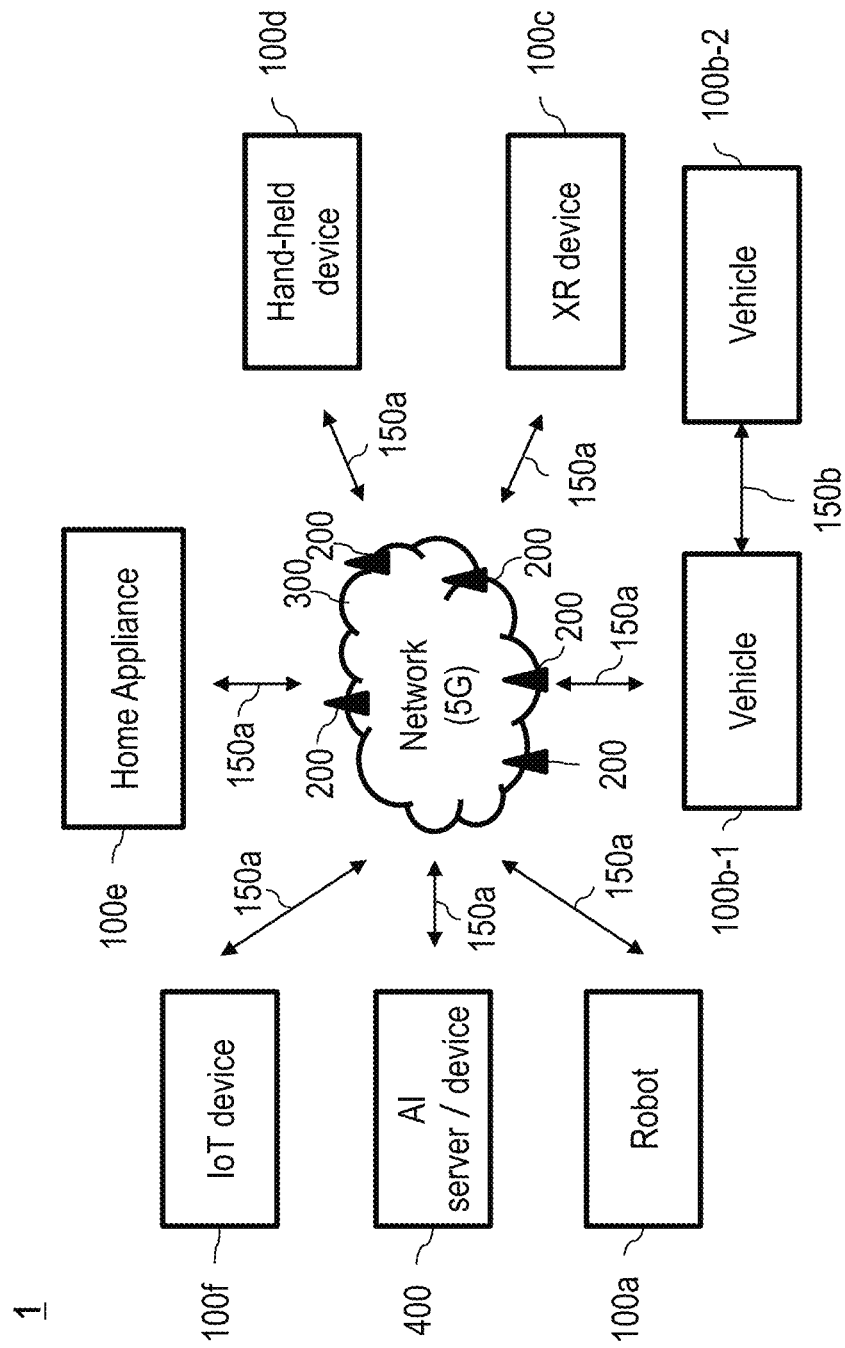
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC_CONNECTED state, not configured with CA or DC, only one serving cell including only the Pcell is present. For a UE in RRC_CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcase information/DCI/DL data on or through a PBCH/PDCCH/PDSCH, respectively.

As more and more communication devices have required greater communication capacity, there has been a need for enhanced mobile broadband (eMBB) communication relative to legacy radio access technology (RAT). In addition, massive MTC (mMTC) for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, mMTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device [200a] may operate as a BS/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
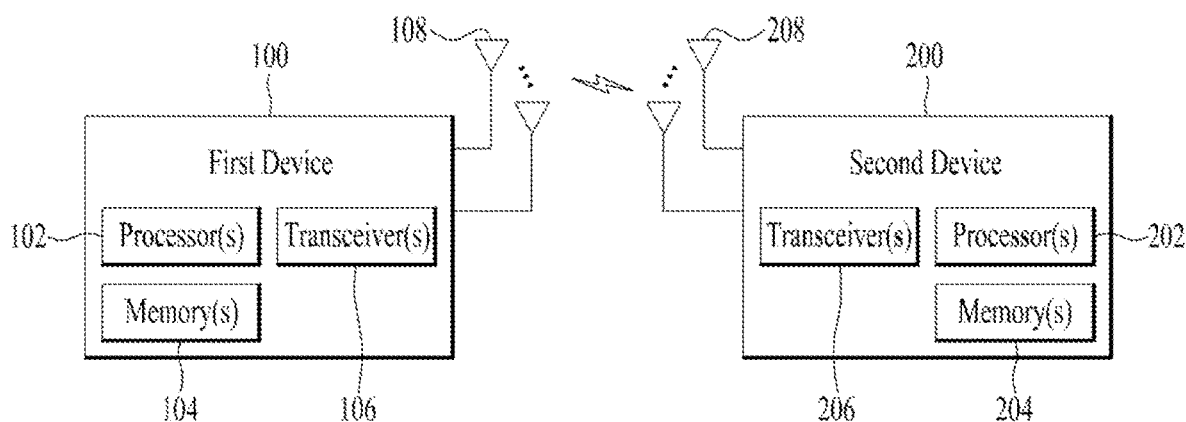
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below -described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
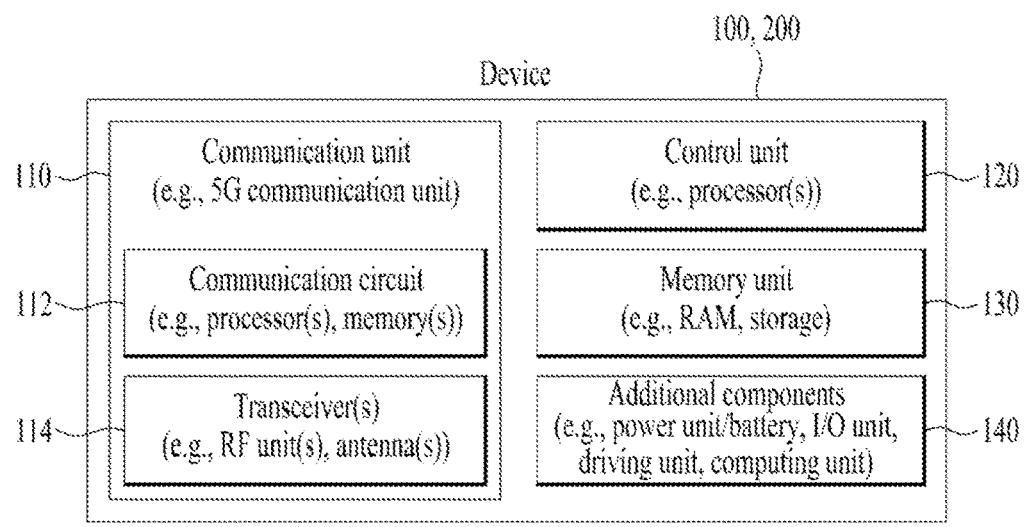
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one memory. The at least one computer memory may store instructions or programs which, when executed, cause the at least one processor operably coupled to the at least one memory to perform operations according to some embodiments or implementations of the present disclosure.

Figure 4:
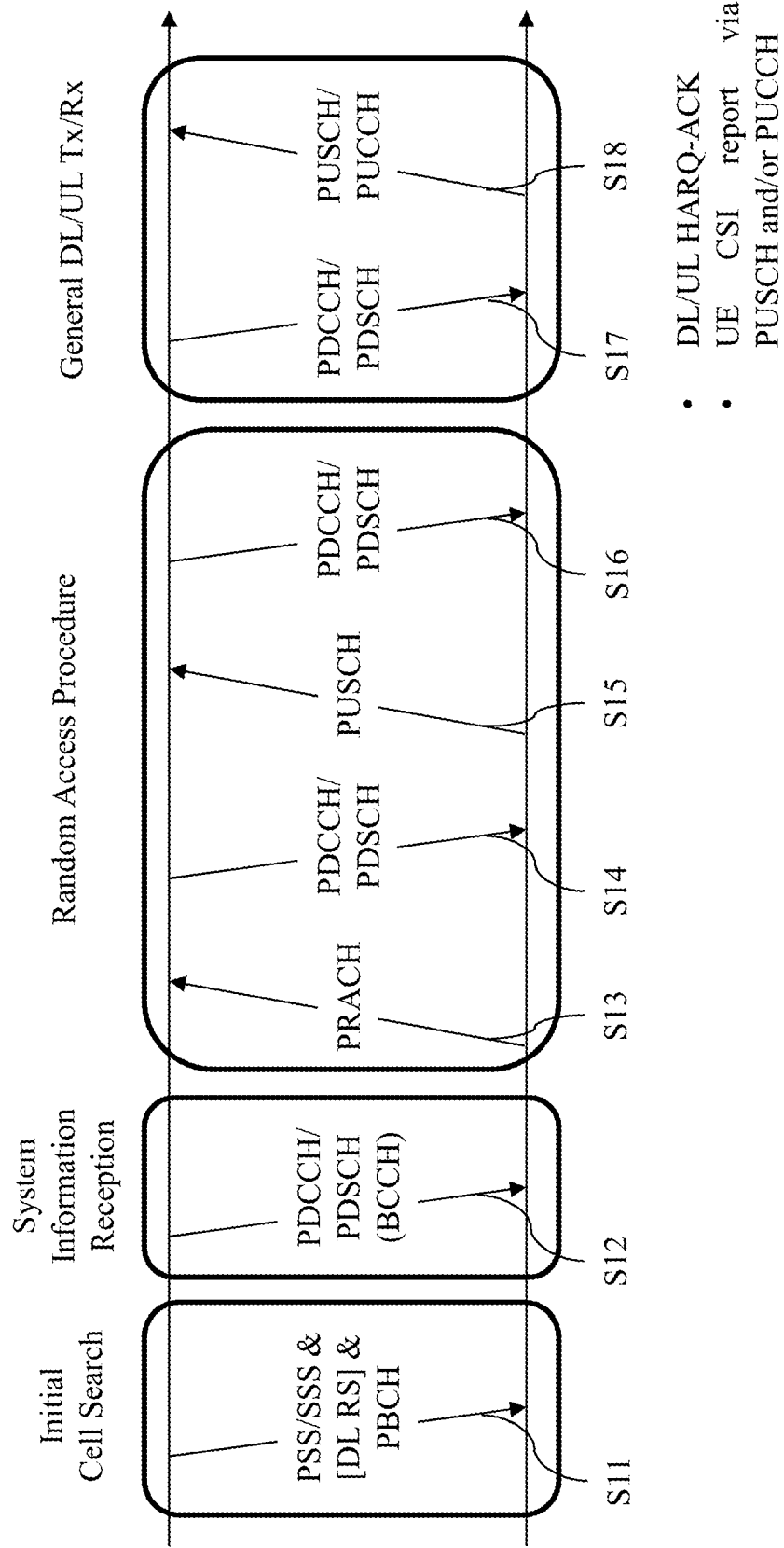
FIG. 4 is a diagram illustrating physical channels used in a 3rd generation partnership project (3GPP)-based communication system as an exemplary wireless communication and a signal transmission/reception procedure using the physical channels.

FIG. 4 is a diagram illustrating physical channels and a signal transmission/reception procedure using the physical channels in a 3GPP-based communication system as an exemplary wireless communication system.

When the UE is powered on or when the UE has been disconnected from the wireless communication system, the UE searches for a cell to camp on and performs initial cell search involving synchronization with a BS in the cell (S11). For the initial cell search, the UE receives a synchronization signal block (SSB or SS/PBCH block). The SSB includes a primary synchronization signal (PSS), a secondary synchronization signal (SSS), and a physical broadcast channel (PBCH). The UE synchronizes with the BS and acquires information such as a cell identifier (ID) based on the PSS/SSS. Further, the UE may obtain broadcast information from the PBCH. The UE may check a DL channel state by receiving a DL reference signal (DL RS) during the initial cell search.

After initial cell search, the UE may camp on the cell. Subsequently, the UE may monitor a PDCCH in the cell and acquire more specific system information (SI) by receiving a PDSCH based on DCI carried on the PDCCH (S12).

The SI is classified into a master information block (MIB) and a plurality of system information blocks (SIBs). The MIB and the SIBs will be described below in brief.

The MIB includes information/parameters related to reception of SystemInformationBlockType1 (SIB1) and is transmitted on a PBCH in an SSB. The UE assumes that a half-frame including the SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (i) a plurality of contiguous RBs and one or more contiguous symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 1). For example, SIB1 may indicate whether SIBx is broadcast periodically or in an on-demand manner upon UE request. If SIBx is provided in the on-demand manner, SIB1 may include information required for the UE to transmit an SI request. SIB1 is transmitted on a PDSCH. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Subsequently, to complete connection to the BS, the UE may perform a random access procedure (S13 to S16). In the random access procedure, for example, the UE may transmit a preamble on a PRACH (S13) and receive a PDCCH and a random access response (RAR) for the preamble on a PDSCH corresponding to the PDCCH (S14). When the UE fails in receiving the RAR directed to the UE, the UE may attempt to retransmit the preamble. In the case of contention-based random access, the UE may transmit a PUSCH based on a UL resource assignment included in the RAR (S15), and perform a contention resolution procedure including reception of a PDCCH and a PDSCH corresponding to the PDCCH (S16).

After the above procedure, the UE may receive a PDCCH/PDSCH from the BS (S17) and transmit a PUSCH/PUCCH to the BS (S18) in a general UL/DL signal transmission procedure. Control information that the UE transmits to the BS is generically called uplink control information (UCI). The UCI includes a hybrid automatic repeat and request acknowledgement/negative acknowledgement (HARQ ACK/NACK), a scheduling request (SR), and channel state information (CSI). The CSI includes a channel quality indicator (CQI), a precoding matrix indicator (PMI), and/or a rank indication (RI). In general, UCI is transmitted on the PUCCH. However, when control information and data should be transmitted simultaneously, the control information may be transmitted on the PUSCH. In addition, the UE may transmit the UCI aperiodically on the PUSCH, upon receipt of a request/command from a network.

FIG. 5 illustrates random access procedures applicable to implementation(s) of the present disclosure. Particularly, FIG. 5(a) illustrates a 4-step random access procedure, and FIG. 5(b) illustrates a 2-step random access procedure.

A random access procedure may be used for various purposes including initial access, UL synchronization adjustment, resource allocation, handover, radio link reconfiguration after radio link failure, and positioning. Random access procedures are classified into a contention-based procedure and a dedicated (i.e., non-contention-based) procedure. The contention-based random access procedure generally involves initial access, whereas the dedicated random access procedure is used for UL synchronization reconfiguration in the event of handover, DL data arrival at a network, and positioning. In the contention-based random access procedure, the UE randomly selects a random access (RA) preamble. Accordingly, it is possible for a plurality of UEs to simultaneously transmit the same RA preamble, and thus a subsequent contention resolution process is required. In the dedicated random access procedure, the UE uses an RA preamble uniquely allocated to the UE by the BS. Therefore, the UE may perform the random access procedure without collision with other UEs.

Referring to FIG. 5(a), the contention-based random access procedure includes the following four steps. The messages transmitted in steps 1 to 4 may be referred to as message 1 (Msg1) to message 4 (Msg4), respectively.

Step 1: The UE transmits an RA preamble on a PRACH.
Step 2: The UE receives an RAR on a PDSCH from the BS.
Step 3: The UE transmits UL data on a PUSCH to the BS. The UL data includes a Layer 2 (L2)/Layer 3 (L3) message.
Step 4: The UE receives a contention resolution message on the PDSCH from the BS.

The UE may receive random access information in system information from the BS. When the UE needs random access, the UE transmits Msg1 (e.g., a preamble) on a PRACH to the BS. The BS may identify each RA preamble by a time/frequency resource (RA occasion (RO)) carrying the RA preamble, and a preamble index (PI). Upon receipt of the RA preamble from the UE, the BS transmits an RAR message to the UE on a PDSCH. To receive the RAR message, the UE monitors an L1/L2 control channel (PDCCH) with a cyclic redundancy check (CRC) masked with a random access-RNTI (RA-RNTI), including scheduling information for the RAR message, within a preconfigured time window (e.g., ra-ResponseWindow). When receiving scheduling information on the PDCCH masked with the RA-RNTI, the UE may receive an RAR message on a PDSCH indicated by the scheduling information. The UE then checks whether there is an RAR directed to the UE in the RAR message. The presence or absence of the RAR directed to the UE may be determined by checking whether there is a random access preamble ID (RAPID) for the preamble transmitted by the UE. The index of the preamble transmitted by the UE may be identical to the RAPID. The RAR includes the index of the corresponding RA preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)). Upon receipt of the RAR, the UE transmits Msg3 on a PUSCH according to the UL scheduling information and the timing offset value in the RAR. Msg3 may include the ID (or global ID) of the UE. Further, Msg3 may include RRC connection request-related information (e.g., RRC-SetupRequest message) for initial access to the network. After receiving Msg3, the BS transmits a contention resolution message, that is, Msg4 to the UE. When the UE receives the contention resolution message and succeeds in contention resolution, the TC-RNTI is changed to a C-RNTI. Msg4 may include the ID of the UE/RRC connection-related information (e.g., an RRCSetup message). When information transmitted in Msg3 does not match information received in Msg4 or when the UE has not received Msg4 for a predetermined time, the UE may determine that the contention resolution has failed and retransmit Msg3.

The dedicated random access procedure includes the following three steps. Messages transmitted in step 0 to step 2 may be referred to as Msg0 to Msg2, respectively. The BS may trigger the dedicated random access procedure by a PDCCH serving the purpose of commanding RA preamble transmission (hereinafter, referred to as a PDCCH order).

Step 0: The BS allocates an RA preamble to the UE by dedicated signaling.
Step 1: The UE transmits the RA preamble on a PRACH.
Step 2: The UE receives an RAR on a PDSCH from the BS.

Step 1 and step 2 of the dedicated random access procedure may be the same as step 1 and step 2 of the contention-based random access procedure.

The NR system may require lower latency than the legacy system. Particularly for a latency-sensitive service such as URLLC, the 4-step random access procedure may not be preferable. A low-latency random access procedure may be needed for various scenarios in the NR system. When implementation(s) of the present disclosure are realized along with a random access procedure, the implementation(s) of the present disclosure may be carried out together with the following 2-step random access procedure to reduce latency involved in the random access procedure.

Referring to FIG. 5(b), the 2-step random access procedure may be performed in two steps: transmission of MsgA from the UE to the BS and transmission of MsgB from the BS to the UE. The MsgA transmission may include transmission of an RA preamble on a PRACH and transmission of UL payload on a PUSCH. In the MsgA transmission, the PRACH and the PUSCH may be transmitted in time division multiplexing (TDM). Alternatively, the PRACH and the PUSCH may be transmitted in frequency division multiplexing (FDM) in the MsgA transmission.

Upon receipt of MsgA, the BS may transmit MsgB to the UE. MsgB may include an RAR for the UE.

An RRC connection request-related message (e.g., RRC-SetupRequest message) requesting establishment of a connection between the RRC layer of the BS and the RRC layer of the UE may be included in the payload of MsgA. In this case, MsgB may be used to transmit RRC connection-related information (e.g., RRCSetup message). In contrast, the RRC connection request-related message (e.g., RRC-SetupRequest message) may be transmitted on a PUSCH based on a UL grant in MsgB. In this case, RRC connection-related information (e.g., RRCSetup message) related to the RRC connection request may be transmitted on a PDSCH associated with the PUSCH transmission after the PUSCH transmission based on MsgB.

Figure 6:
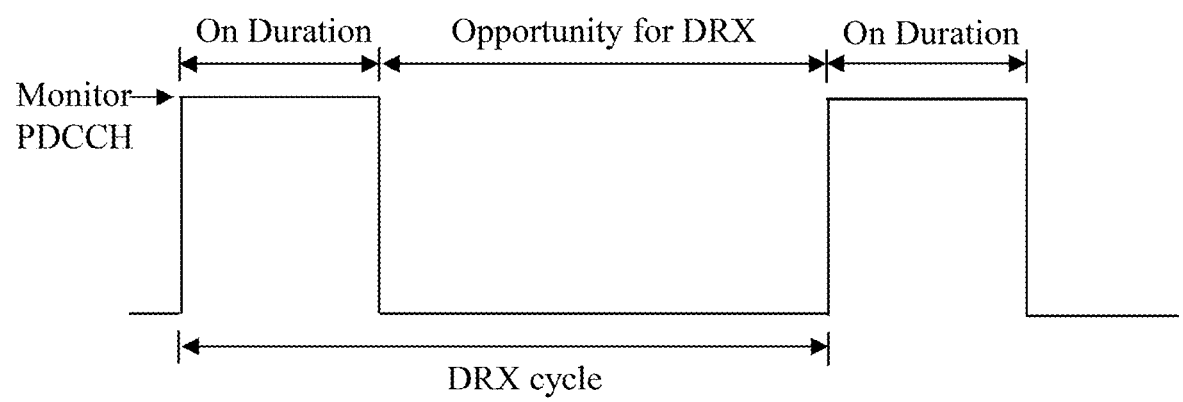
FIG. 6 is a diagram illustrating an exemplary discontinuous reception (DRX) operation applied to implementation(s) of the present disclosure.

FIG. 6 is a diagram illustrating a discontinuous reception (DRX) operation applied to implementation(s) of the present disclosure.

The UE may perform a DRX operation in a procedure and/or method according to implementation(s) of the present disclosure. When the UE is configured with DRX, the UE may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

FIG. 6 illustrates a DRX cycle for an RRC_CONNECTED UE. Referring to FIG. 6, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the procedure and/or method according to implementation(s) of the present disclosure. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the procedure and/or method according to implementation(s) of the present disclosure. For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

The following table describes a DRX operation of a UE. Referring to the following table, DRX configuration information is received by higher-layer signaling (e.g., RRC signaling), and DRX ON/OFF is controlled by a DRX command from the MAC layer. Once DRX is configured, the UE may perform PDCCH monitoring discontinuously, as illustrated in FIG. 6.

TABLE 1

| | Type of signals | UE procedure |
| --- | --- | --- |
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

Figure 7:
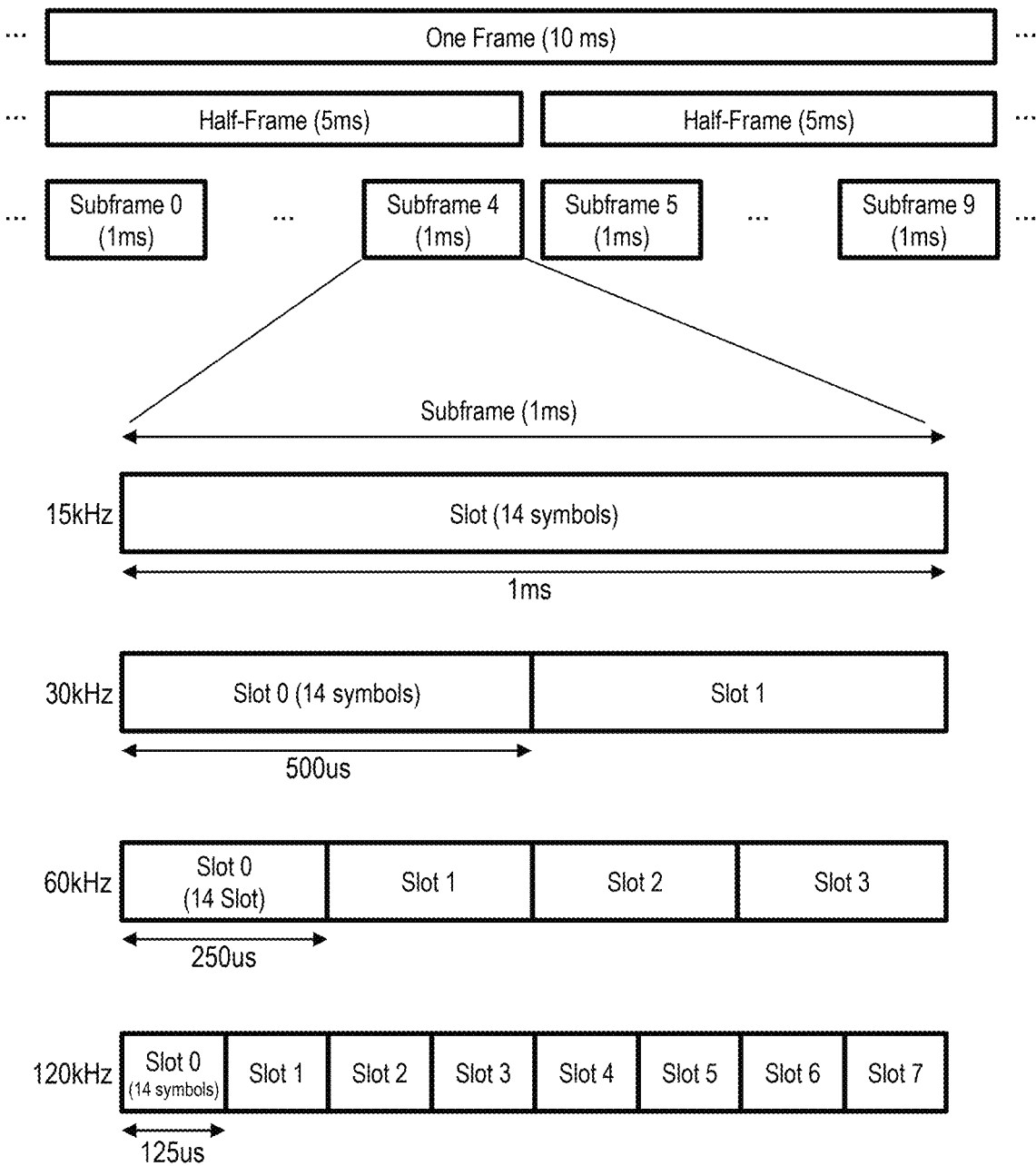
FIG. 7 illustrates an example of a frame structure used in a 3rd generation partnership project (3GPP)-based wireless communication system.

FIG. 7 illustrates an example of a frame structure used in a 3GPP-based wireless communication system.

The frame structure of FIG. 7 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably Referring to FIG. 7, in the NR system, UL and DL transmissions are organized into frames. Each frame has a duration of $T_f$=10 ms and is divided into two half-frames of 5 ms each. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($B^{subframe,u}_{slot}$) per subframe.

TABLE 2

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 3

| u | $N^{slot}_{symb}$ | $N^{frame, u}_{slot}$ | $N^{subframe, u}_{slot}$ |
|---|---|---|---|
| 2 | 12 | 40 | 4 |

Figure 8:
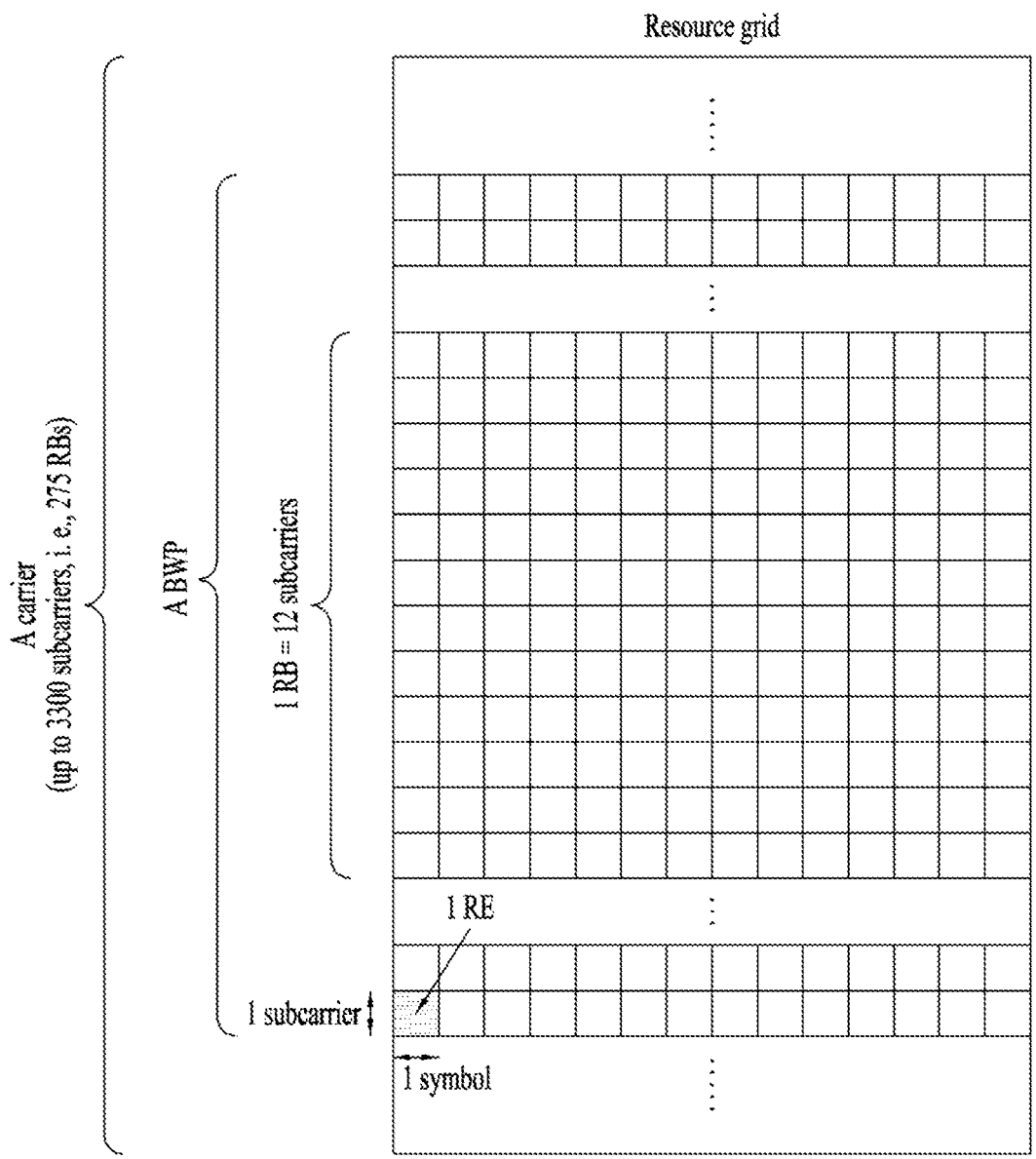
FIG. 8 illustrates a resource grid of a slot.

FIG. 8 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain.

In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i} - 1$, where i is a number of the BWP. The relation between a PRB $n_{PRB}$ in a BWP i and a CRB $n_{CRB}$ is given by: $n_{PRB} = n_{CRB} + N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

Figure 9:
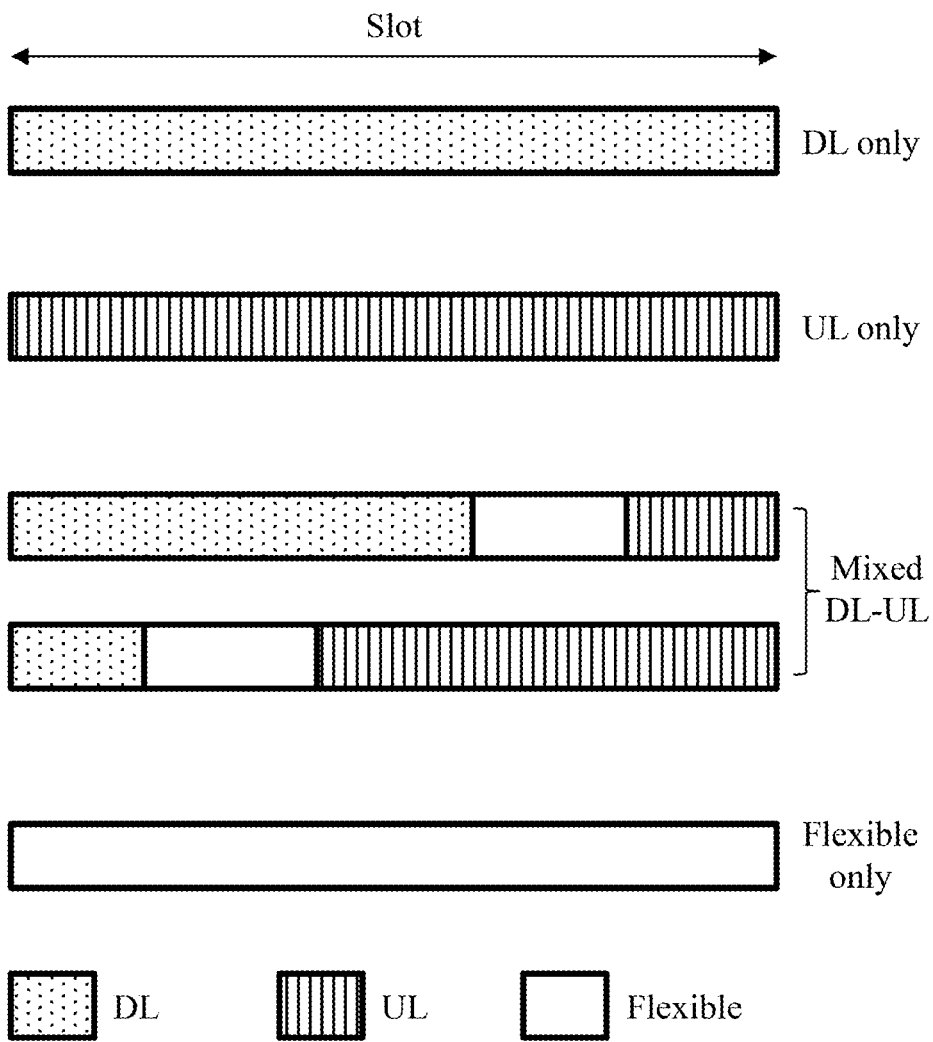
FIG. 9 is a diagram illustrating a resource grid of a slot.

FIG. 9 is a diagram illustrating exemplary slot structures which may be used in the 3GPP-based system. In every 3GPP-based system, for example, the NR system, each slot may have a self-contained structure with i) a DL control channel, ii) DL or UL data, and/or iii) a UL control channel. For example, the first N symbols of a slot may be used to deliver a DL control channel (hereinafter, referred to as a DL control region), and the last M symbols of the slot may be used to deliver a UL control channel (hereinafter, referred to as a UL control region). Each of N and M is 0 or a positive integer. A resource region (hereinafter, referred to as a data region) between the DL control region and the UL control region may be used to deliver DL data or UL data. The symbols of a single slot may be divided into group(s) of consecutive symbols available as DL symbols, UL symbols, or flexible symbols. Hereinbelow, information specifying the usages of symbols in a slot is referred to as a slot format. For example, a slot format may define which symbols are to be used for UL and which symbols are to be used for DL.

When a serving cell is to be operated in a TDD mode, the BS may configure a UL and DL allocation pattern for the serving cell by higher-layer signaling (e.g., RRC signaling). For example, the following parameters may be used to configure a TDD DL-UL pattern:

dl-UL-TransmissionPeriodicity indicating the periodicity of a DL-UL pattern;

nrofDownlinkSlots indicating the number of consecutive full DL slots at the beginning of each DL-UL pattern, where a full DL slot is a slot including DL symbols only;

nrofDownlinkSymbols indicating the number consecutive DL symbols at the beginning of the slot following the last full DL slot;

nrofUplinkSlots indicating the number of consecutive full UL slots at the end of each DL-UL pattern, where a full UL slot is a slot including UL symbols only; and nrofUplinkSymbols indicating the number of consecutive UL symbols at the end of the slot preceding the first full UL slot.

The remaining symbols configured neither as DL nor as UL among the symbols of the DL-UL pattern are flexible symbols.

Upon receipt of a configuration for a TDD DL-UL pattern, that is, a TDD UL-DL configuration (e.g., tdd-UL-DL-ConfigurationCommon or tdd-UL-DLConfigurationDedicated) by higher-layer signaling, the UE sets a slot format for each slot across the slots.

Although various combinations may be produced out of DL symbols, UL symbols, and flexible symbols, a specific number of combinations may be predefined as slot formats, and the predefined slot formats may be identified by slot format indexes. The following table lists some of the predefined slot formats. In the table, D denotes DL symbol, U denotes UL symbol, and F denotes flexible symbol.

TABLE 4

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | ... | | | | | | | | |

To indicate which one of the predefined slot formats to be used for a specific slot, the BS may configure a set of slot format combinations available for each serving cell in a set of serving cells by higher-layer signaling (e.g., RRC signaling), and configure the UE to monitor a group-common PDCCH for slot format indicator(s) (SFI(s)) by higher-layer signaling (e.g., RRC signaling). DCI carried on the group-common PDCCH for the SFI(s) is referred to as SFI DCI. DCI format 2_0 is used for the SFI DCI. For example, for each serving cell in a set of serving cells, the BS may provide the UE with the (starting) position of a slot format combination ID (i.e., SFI-index) for the serving cell, a set of slot format combinations applicable to the serving cell, and a reference SCS configuration for each slot format in a slot format combination indicated by an SFI-index value in the SFI DCI. For each slot format combination in the set of slot format combinations, one or more slot formats are configured and a slot format combination ID (i.e., SFI-index) is assigned. For example, when the BS is to configure a slot format combination with N slot formats, the BS may indicate N ones of slot format indexes for the predefined slot formats (e.g., refer to Table 4) for the slot format combination. To configure the UE to monitor the group-common PDCCH for SFIs, the BS indicates an RNTI used for SFIs, SFI-RNTI and the total length of DCI payload scrambled with the SFI-RNTI to the UE. Upon detection of a PDCCH based on the SFI-RNTI, the UE may determine slot format(s) for a corresponding serving cell from an SFI-index for the serving cell among SFI-indexes in DCI payload of the PDCCH.

Symbols indicated as flexible by a TDD DL-UL pattern configuration may be indicated as UL, DL, or flexible by SFI DCI. Symbols indicated as DL/UL by the TDD DL-UL pattern configuration are not overridden as UL/DL or flexible by the SFI DCI.

When the UE is not configured with a TDD DL-UL pattern, the UE determines for each slot whether the slot is for UL or DL, and symbols allocation in the slot based on SFI DCI and/or DCI that schedules or triggers a DL or UL signal transmission (e.g., DCI format 1_0, DCI format 1_1, DCI format 1_2, DCI format 0_0, DCI format 0_1, DCI format 0_2, and DCI format 2_3).

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Identifies a CORESET related to a search space set.

monitoringSlotPeriodicityAndOffset: Indicates slots for PDCCH monitoring configured as a periodicity and an offset.

monitoringSymbolsWithinSlot: Indicates the first symbol(s) for PDCCH monitoring in the slots for PDCCH monitoring.

nrofCandidates: Indicates the number of PDCCH candidates for each CCE aggregation level.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARD)—acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as an HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 3, (0) PUCCH format 0 (PF0 or F0)
Supported UCI payload size: up to K bits (e.g., K=2)
Number of OFDM symbols constituting a single PUCCH: 1 to X symbols (e.g., X=2)
Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH format 1 (PF1 or F1)
Supported UCI payload size: up to K bits (e.g., K=2)
Number of OFDM symbols constituting a single PUCCH: Y to Z symbols (e.g., Y=4 and Z=14)
Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH format 2 (PF2 or F2)
Supported UCI payload size: more than K bits (e.g., K=2)
Number of OFDM symbols constituting a single PUCCH: 1 to X symbols (e.g., X=2)
Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH format 3 (PF3 or F3)
Supported UCI payload size: more than K bits (e.g., K=2)
Number of OFDM symbols constituting a single PUCCH: Y to Z symbols (e.g., Y=4 and Z=14)
Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2< the number of UCI bits=<$N_1$

. . .

PUCCH resource set #(K-1), if $N_{K-2}$< the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 5).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PM). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

The PUSCH delivers UL data (e.g., UL-SCH TB) and/or UCI and is transmitted based on a CP-OFDM waveform or a DFT-s-OFDM waveform. When the PUSCH is transmitted based on the DFT-s-OFDM waveform, the UE transmits the PUSCH by applying transform precoding. For example, when transform precoding is impossible (e.g., transform precoding is disabled), the UE transmits the PUSCH based on the CP-OFDM waveform, and when transform precoding is possible (e.g., transform precoding is enabled), the UE transmits the PUSCH based on the CP-OFDM waveform or the DFT-s-OFDM waveform. The PUSCH transmission may be scheduled dynamically by a UL grant in DCI or semi-statically by higher-layer (e.g., RRC) signaling (and/or layer 1 (L1) signaling (e.g., PDCCH)). A resource assignment scheduled semi-statically by higher-layer (e.g., RRC) signaling (and/or L1 (i.e., PHY) signaling) is referred to as a configured grant. The PUSCH transmission may be performed in a codebook-based or non-codebook-based manner.

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

*Resource Allocation by PDCCH: dynamic grant/assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 10:
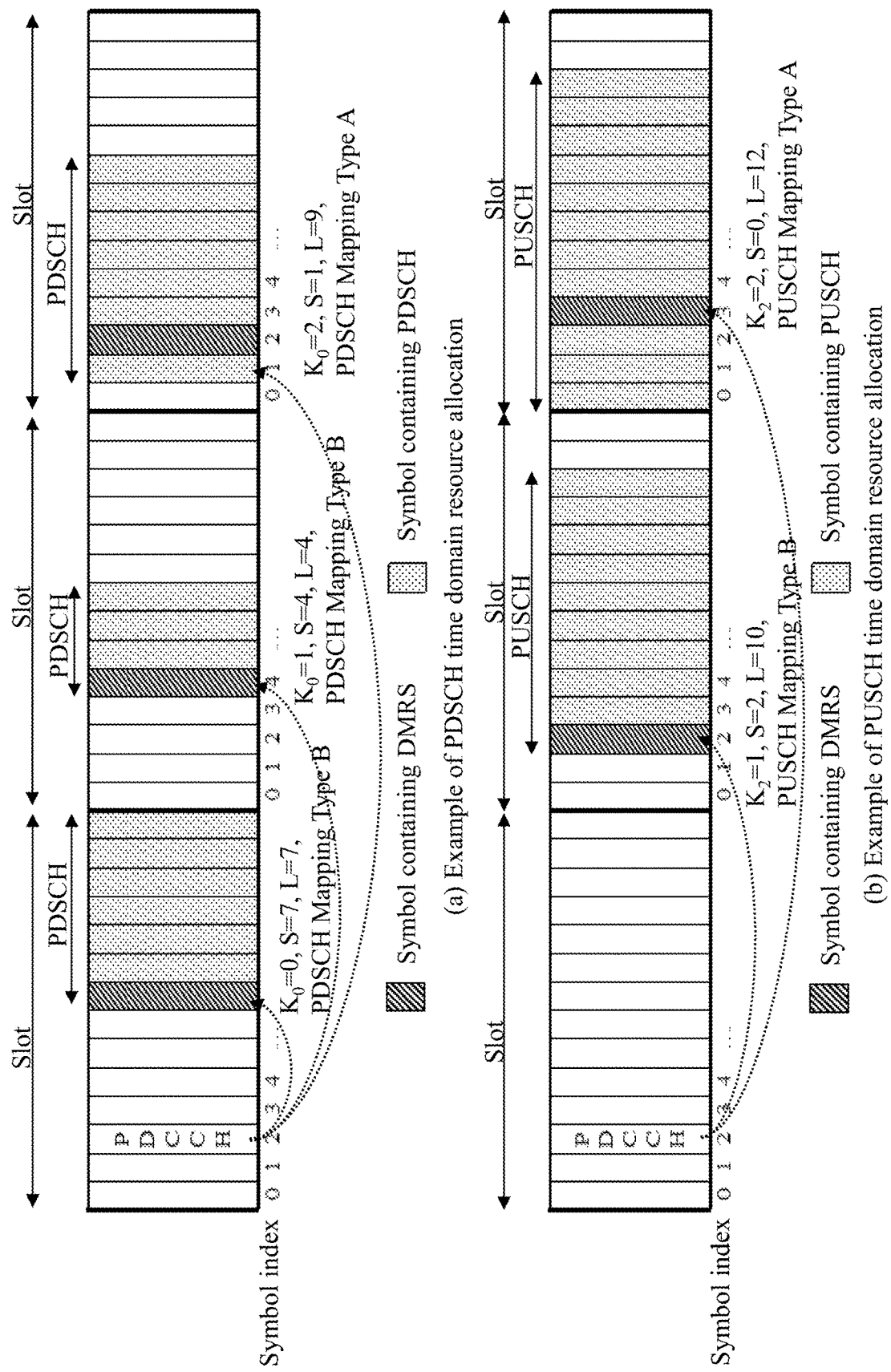
FIG. 10 is a diagram illustrating an example of physical downlink shared channel (PDSCH) time-domain resource allocation based on a PDCCH and an example of physical uplink shared channel (PUSCH) time-domain resource allocated based on a PDCCH.

FIG. 10 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

*Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;
periodicity corresponding to a periodicity of configured grant Type 1;
timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N >=0, where numberOfSlotsPerFrame and numberOfSymbolsPerSlot indicate the number of consecutive slots per frame and the number of consecutive OFDM symbols per slot, respectively (refer to Table 2 and Table 3).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame numberOfSymbolsPerSlot)+(slot number in the frame*numberOfSymbolsPerSlot)+symbol number in the slot]=[(SFNstart time*numberOfSlotsPerFrame*numberOfSymbolsPerSlot+ slotstart time*numberOfSymbolsPerSlot+symbolstart time)+N*periodicity]modulo (1024 numberOfSlotsPerFrame*numberOfSymbolsPerSlot), for all N >=0, where SFNstart time, slotstart time, and symbolstart time represent an SFN, a slot, and a symbol, respectively, of the first transmission opportunity of the PUSCH after the configured grant is (re-) initialized, and numberOfSlotsPerFrame and numberOfSymbolsPerSlot indicate the number of consecutive slots per frame and the number of consecutive OFDM symbols per slot, respectively (refer to Table 2 and Table 3).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFNstart time+ slotstart time)+N*periodicity numberOfSlotsPerFrame/10] modulo (1024*numberOfSlotsPerFrame), where SFNstart time and slotstart time represent an SFN and a slot, respectively, of first transmission of the PDSCH after configured DL assignment is (re-) initialized, and numberOfSlotsPerFrame and numberOfSymbolsPerSlot indicate the number of consecutive slots per frame and the number of consecutive OFDM symbols per slot, respectively (refer to Table 2 and Table 3).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 6 and Table 7. Table 6 shows an example of special fields for DL SPS and UL grant Type 2 scheduling activation PDCCH validation, and Table 7 shows an example of special fields for DL SPS and UL grant Type 2 scheduling release PDCCH validation.

TABLE 6

|  | DCI format 0_0/0_1 | DCI format 1_0 | DCI format 1_1 |
| --- | --- | --- | --- |
| HARQ process number | set to all '0's | set to all '0's | set to all '0's |
| Redundancy version | set to '00' | set to '00' | For the enabled transport block: set to '00' |

TABLE 7

|  | DCI format 0_0 | DCI format 1_0 |
| --- | --- | --- |
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 11:
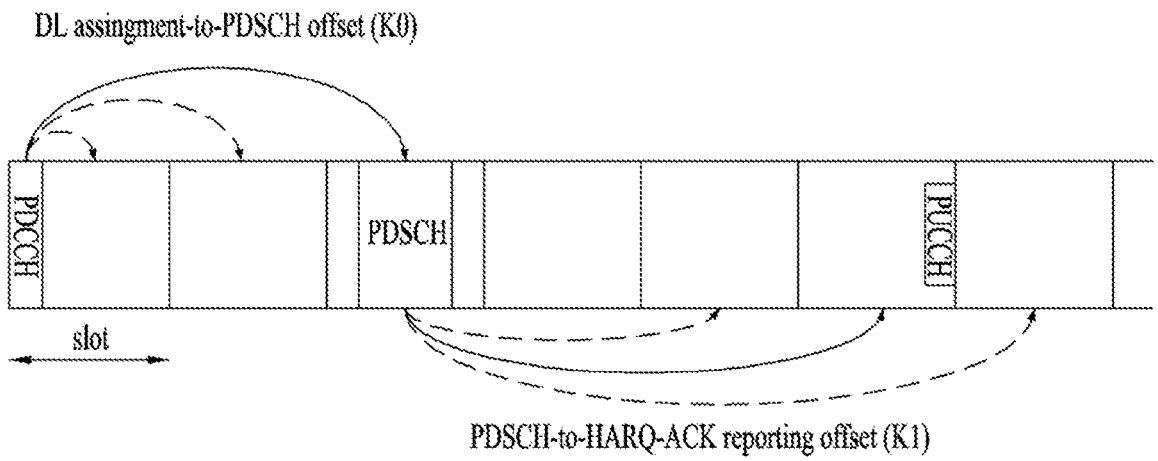
FIG. 11 illustrates a hybrid automatic repeat request-acknowledgement (HARQ-ACK) transmission/reception procedure.

FIG. 11 illustrates a HARQ-ACK transmission/reception procedure.

Referring to FIG. 11, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH. If the PDSCH is configured to transmit a maximum of one TB, a HARQ-ACK response may consist of one bit. If the PDSCH is configured to transmit a maximum of 2 TBs, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

For a service with strict latency and reliability requirements (e.g., URLLC service), a PUSCH/PDSCH may have to be transmitted with higher reliability than in other existing services. To increase the reliability of PUSCH/PDSCH transmission, repeated transmissions of the PUSCH/PDSCH may be considered. For example, a BS may configure repeated PUSCH/PDSCH transmissions in K consecutive slots for a UE, and the UE may repeat a TB transmission/reception in the K consecutive slots. In some embodiments or implementations of the present disclosure, the same symbol allocation may be applied across the K consecutive slots. In other words, the K consecutive slots may be identical in terms of the index of the starting symbol and the number of symbols for the PUSCH/PDSCH. When the same resource allocation is used for repeated PUSCH/PDSCH transmissions, the reliability or coverage of the PUSCH/PDSCH transmission may be ensured. However, when only the same resource allocation is allowed for the PUSCH/PDSCH in consecutive slots scheduled for repeated PUSCH/PDSCH transmissions, this may make flexible resource allocation difficult. Moreover, when the UE has to perform PDCCH reception and PUSCH allocation in one slot to satisfy a latency requirement, only a few symbols in the latter half of the slot may be available for PUSCH transmission, resulting in deferral of the repeated transmissions to the following slot. In this case, when the UE needs to perform a predetermined number of repeated transmissions to secure reliability, a long latency may occur in the PUSCH/PDSCH transmission/reception. Therefore, for more flexible and efficient resource utilization and service support, and faster and more robust UL channel transmission, it is preferable to support a plurality of PUSCH/PDSCH transmissions in one slot by repeating a PUSCH/PDSCH transmission at intervals smaller than a slot, or to transmit the PUSCH/PDSCH regardless of a slot boundary. When a plurality of PUSCHs/PDSCHs are transmitted in one slot, frequency hopping for changing frequency resources between PUSCH/PDSCH transmissions may be additionally considered to secure reliability through frequency diversity.

A PUSCH/PDSCH transmission based on a configured grant as well as a PUSCH/PDSCH transmission based on a dynamic UL/DL grant may be repeated. In some embodiments or implementations of the present disclosure, in the case of a PUSCH/PDSCH transmission based on a configured grant, a resource allocation for one TB is always determined within one period of the configured grant. For example, the time duration of K repeated transmissions of one TB does not exceed a time duration derived from the periodicity P of the configured grant. When repeated transmissions are performed based on the configured grant, use of the same resource allocation in consecutive slots for the repeated transmissions is preferable in terms of sufficient reliability. In some embodiments/implementations of the present disclosure, the UE transmits/receives a PUSCH/PDSCH only at positions determined according to a redundancy version (RV) sequence among a plurality of PUSCH/PDSCH resources within the period of the configured grant. For example, in some embodiments/implementations, when a configured RV sequence is {0, 2, 3, 1}, the UE starts an initial transmission of a TB in the first of K transmission occasions (TO) for K repeated transmissions. In this case, it may be necessary to secure a long time to ensure the reliability of the PUSCH/PDSCH transmission, or it may be difficult to set a short period for a plurality of PUSCH resources. Particularly when the TB transmission starts in the middle of the plurality of PUSCH/PDSCH resources, that is, in the middle of the TOs within the period of the configured grant, it may be difficult to repeat the TB transmission a sufficient number of times.

Since the periodicity of the configured grant is closely related to the latency of the PUSCH/PDSCH, there may be a need for allowing an operation using a configured grant with a short periodicity regardless of the transmission duration of the PUSCH/PDSCH (e.g., the number of symbols occupied by the PUSCH/PDSCH). Alternatively, it may be necessary to allow a sufficient number of repeated transmissions, even when a TB transmission starts in the middle of PUSCH/PDSCH resources in the time domain. Accordingly, repeated PUSCH/PDSCH transmissions at intervals shorter than a slot may be required.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

Depending on application fields or traffic types, various reference time units may be assumed/used to transmit/receive a physical channel. A reference time may be a basic unit for scheduling a specific physical channel, and a reference time unit may be changed according to the number of symbols and/or a subcarrier spacing (SCS) in the scheduling time unit. Some embodiments/implementations of the present disclosure are described in the context of a slot or mini-slot as a reference time unit, for convenience of description. A slot may be, for example, a basic scheduling unit used for general data traffic (e.g., eMBB). A mini-slot may have a shorter duration than a slot in the time domain, and may be a scheduling basic unit used for a special purpose or for a special communication scheme (e.g., URLLC, an unlicensed band, or millimeter wave). However, the embodiment(s)/implementation(s) of the present disclosure may also be applied to physical channel transmission/reception in mini slots for eMBB or physical channel transmission/reception in slots for URLLC or other communication schemes.

In some scenarios of wireless access technology, when a wireless transmission and a resource allocation for the wireless transmission are dynamically indicated to a UE by DCI, the UE does not expect that the link direction of the resource allocation indicated by a BS will collide with a link direction indicated by a semi-static DL/UL configuration or a slot format indicator (SFI). For example, in some scenarios, the UE does not expect that a symbol indicated as a UL symbol by a semi-static DL/UL configuration or SFI DCI is indicated as DL resources by DCI. In another example, in some scenarios, the UE does not expect that a symbol indicated as a DL symbol by a semi-static DL/UL configuration or SFI DCI is indicated as UL resources by DCI. In these scenarios, the UE may perform an indicated operation, fully trusting the dynamically received UL or DL transmission indication. Further, when a resource area allocated dynamically by DCI is repeated over a plurality of slots (e.g., when a resource area allocated dynamically by DCI is applied to each of a plurality of consecutive slots), the UE does not expect that the link direction of an initial transmission indicated explicitly by the DCI will collide with a link direction indicated by a semi-static DL/UL configuration or an SFI. When the repeated transmissions indicated by the DCI collide with the semi-static DL/UL configuration or the link direction indicated by the semi-static DL/UL configuration or the SFI, the UE performs an indicated operation, while skipping a corresponding transmission/reception.

In some implementations of the present disclosure, a link direction indicated by a semi-static DL/UL configuration may be the link direction of a DL or UL transmission configured by RRC signaling, system information, and/or UE-dedicated RRC signaling. For example, the link directions of symbols based on a UE-common or UE-specific TDD DL-UL pattern configured by RRC signaling may be link directions indicated by the semi-static DL/UL configuration. In another example, a UE-common or UE-dedicated pattern of symbols invalid for DL/UL transmission may be configured by RRC signaling, and the link directions of symbols valid for DL/UL indicated by the pattern may be the link directions indicated by the semi-static DL/UL configuration. When the BS provides an unavailable resource set for a PDSCH or a PUSCH to the UE (e.g., by rate-matching pattern information), DL or UL symbols which are not indicated as invalid DL or UL symbols by the resource set may be semi-statically configured DL/UL symbols.

Scenarios may be considered, in which the BS allocates resources at once across a wide time area including a slot boundary, and the UE or the BS performs a transmission/reception only during a period of available consecutive resources. In the scenarios, the BS may have difficulty in scheduling a transmission/reception, avoiding unavailable resources all the time. In other words, it may be difficult for the BS/UE to consider that available resources are always contiguous even though a slot boundary is excluded. Omitting a transmission/reception having a different link direction from that of resources indicated by a semi-static DL/UL configuration or an SFI among transmissions/receptions indicated through one-shot scheduling by the BS may cause significant performance degradation for the data transmission/reception. In the case where the UE/BS divides a transmission duration of 14 symbols in total into a transmission duration of 10 symbols and a transmission duration of 4 symbols and performs a transmission spanning 10 symbol durations and a transmission spanning 4 symbol durations, even when collision occurs only to one of the former 10 symbols, the BS performs the transmission only in the latter 4 symbols, omitting the transmission in the whole 10 symbols. This performance degradation may cause a big problem in a transmission sensitive to reliability (e.g., URLLC transmission). This problem may occur to a resource allocation for a single transmission in a slot or repeated use of a plurality of small resource allocations in a slot as well as a resource allocation including a slot boundary (hereinafter, referred to as a multi-segment resource allocation). To avert the problem, the present disclosure proposes that even though some of the symbols of allocated resources are unavailable, the remaining symbols except for the unavailable symbols are used for a transmission, instead of excluding the whole resources from the transmission. While implementations of the present disclosure are described in the context of the multi-segment resource allocation by way of example, the implementations of the present disclosure may also be applied to other resource allocation methods.

Figure 12:
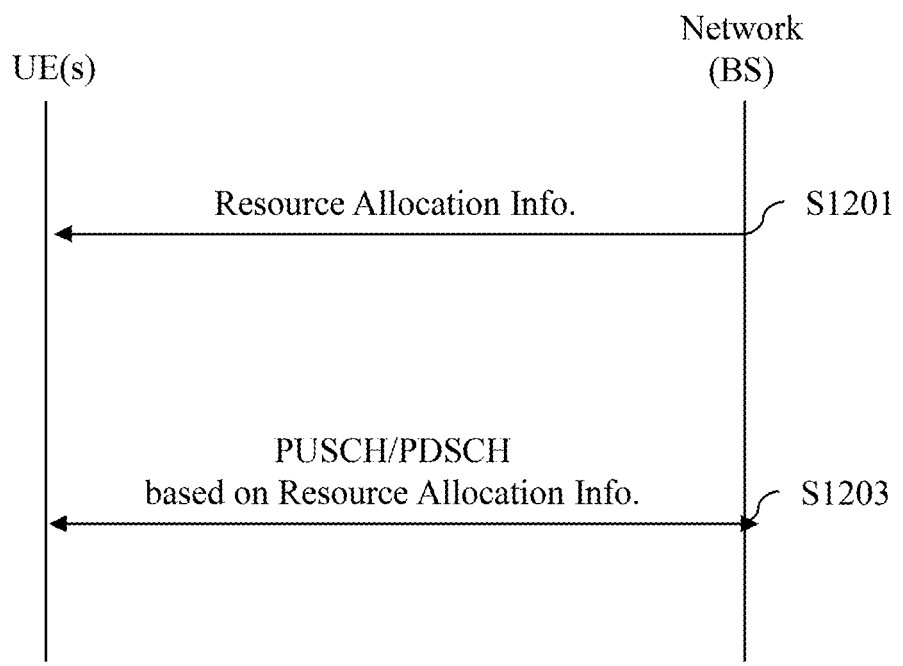
FIG. 12 is a diagram illustrating an exemplary uplink/downlink (UL/DL) transmission procedure for some embodiments/implementations of the present disclosure.

FIG. 12 is a diagram illustrating an exemplary UL/DL transmission process for some embodiments/implementations of the present disclosure.

Referring to FIG. 12, a network (e.g., at least one BS) may transmit resource allocation information to a UE (S1201). The resource allocation information may be transmitted by physical-layer signaling (e.g., on a PDCCH). For example, the resource allocation information may correspond to UL grant DCI for a PUSCH or DL grant DCI for a PDSCH. The resource allocation information may be transmitted by other higher-layer signaling (e.g., RRC signaling), not limited to the physical-layer signaling. The network may transmit a PDSCH to the UE and/or receive a PUSCH from the UE based on the resource allocation information (S1203).

The UE may receive a message including the resource allocation information (S1201). For example, the UE may perform blind detection to receive DCI including the resource allocation information. The UE may decode the DCI including the resource allocation information. For example, the UE may detect the DCI in at least one of PDCCH candidates by attempting to decode (blind-detect or blind-decode) the PDCCH candidates. The UE may receive the PDSCH and/or transmit the PUSCH based on the resource allocation information (S1203).

The process of FIG. 12 may be applied to examples of the present disclosure described below. For convenience, it is assumed that a plurality of resource units (e.g., slots) are allocated/indicated to the UE by the exemplary (one-shot) resource allocation information described with reference to FIG. 12. In other words, it is assumed that a plurality of PUSCH transmissions or PDSCH transmissions are allocated/indicated by one DCI or one resource allocation message.

Even though the UE receives resource allocation information corresponding to a plurality of slots, some of allocated radio resources may be unavailable to the UE as resources for a corresponding PDSCH/PUSCH transmission according to a slot format configuration and indication from the BS. For example, when PUSCH resources corresponding to the plurality of slots are allocated to the UE, symbols corresponding to at least some of the PUSCH resources may be actually unavailable for UL. The resources unavailable for UL may correspond to resources which are configured/indicated as DL (e.g., fixed DL) resources or reserved resources (e.g., flexible resources) by an SFI in SFI DCI and/or a semi-static DL(UL) configuration (e.g., RRC signaling, system information, or UE-dedicated semi-static signaling) and thus unusable for UL. It may occur that the UE is not capable of transmitting the PUSCH in a corresponding slot (e.g., a slot including an unavailable symbol) in view of the symbol unavailable for UL.

The UE and the BS may derive/determine the same resources available for an actual PDSCH or PUSCH transmission from among resources allocated to the UE based on common information that the UE and the BS have, which solves the afore-described problem. For example, as the UE and the BS derive/determine the same resources available for the actual transmission, the UE and the BS may perform the PDSCH or PUSCH transmission/reception in the resources that the UE and the BS identify as usable, even though a complex slot format is given or a corresponding slot format is not accurately aligned with the resource allocation.

As described before, the slot format of a slot may be configured by a semi-static UL/DL configuration (e.g., TDD-UL-DL-Configuration) or indicated by a dynamic SFI (e.g., SFI DCI). Each of the symbols of the slot may be indicated as "DL", "flexible", or "UL" by the semi-static UL/DL configuration or the SFI DCI. Hereinbelow, the link direction of a symbol indicated as "DL", "flexible", or "UL" by a semi-static UL/DL configuration or SFI DCI is referred to as a slot format. In some implementations of the present disclosure, considering the possibility that DCI (e.g., SFI DCI) is missing, only a result (e.g., slot format) configured by the semi-static UL/DL configuration, not by the SFI DCI may be considered in determining whether scheduled transmission symbols are available.

The following description will be given with the appreciation that "the end of the last DL" or "the end of the last part of DL" refers to the end of a DL reception (e.g., a configured DL reception such as PDCCH monitoring, an SS/PBCH, or a CSI-RS measurement, or a PDSCH reception indicated by DCI) expected (i.e., reserved) or performed shortly before a UL transmission or a UL resource allocation, or the end of a set of symbols having a slot format indicated or configured as DL.

In the present disclosure, one UL transmission or one DL transmission may be performed in a set of contiguous symbols. In the present disclosure, when sets of contiguous symbols are used for a plurality of UL transmissions or a plurality of DL transmissions, the sets of contiguous symbols may be non-contiguous by unavailable symbol(s) or may be divided by a slot boundary.

In the present disclosure, the time-domain position of resources available for one PUSCH or PDSCH transmission may be referred to as a transmission opportunity or a transmission occasion (a reception opportunity or a reception occasion from the perspective of a receiving end). In some embodiments of the present disclosure, when some of symbols spanned by one transmission opportunity/occasion are unavailable for a PUSCH/PDSCH transmission, a set of the remaining contiguous symbols except for the unavailable symbols may form a (new or adjusted) transmission opportunity/occasion. In some embodiments of the present disclosure, when some of symbols spanned by one transmission opportunity/occasion are unavailable for a PUSCH/PDSCH transmission, the PUSCH/PDSCH transmission may be omitted in the one transmission opportunity/occasion. In some embodiments of the present disclosure, when at least one of a plurality of contiguous symbols in a slot is unavailable for an indicated transmission and the unavailable symbol(s) is not located at an edge of the set of the plurality of contiguous symbols, each of sets of contiguous symbols except for the unavailable symbol(s) among the plurality of contiguous symbols may form a transmission opportunity/occasion.

Further, a set of symbols indicated for a UL transmission or a DL transmission by resource allocation information/message is referred to as a given set of symbols.

Figure 13:
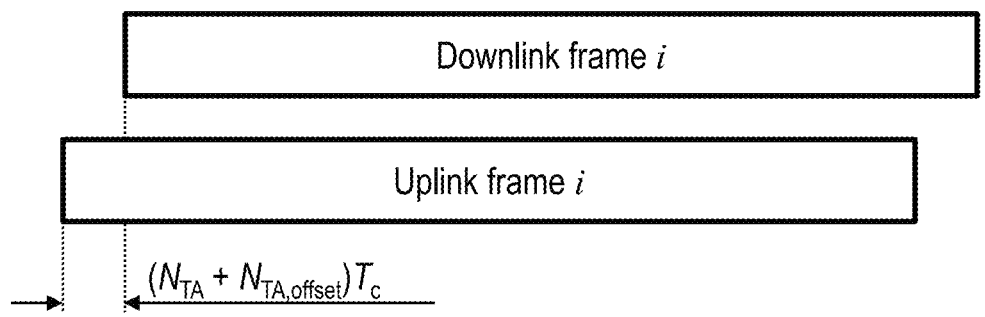
FIG. 13 is a diagram illustrating an exemplary uplink-downlink (UL-DL) timing relationship.
Figure 14:
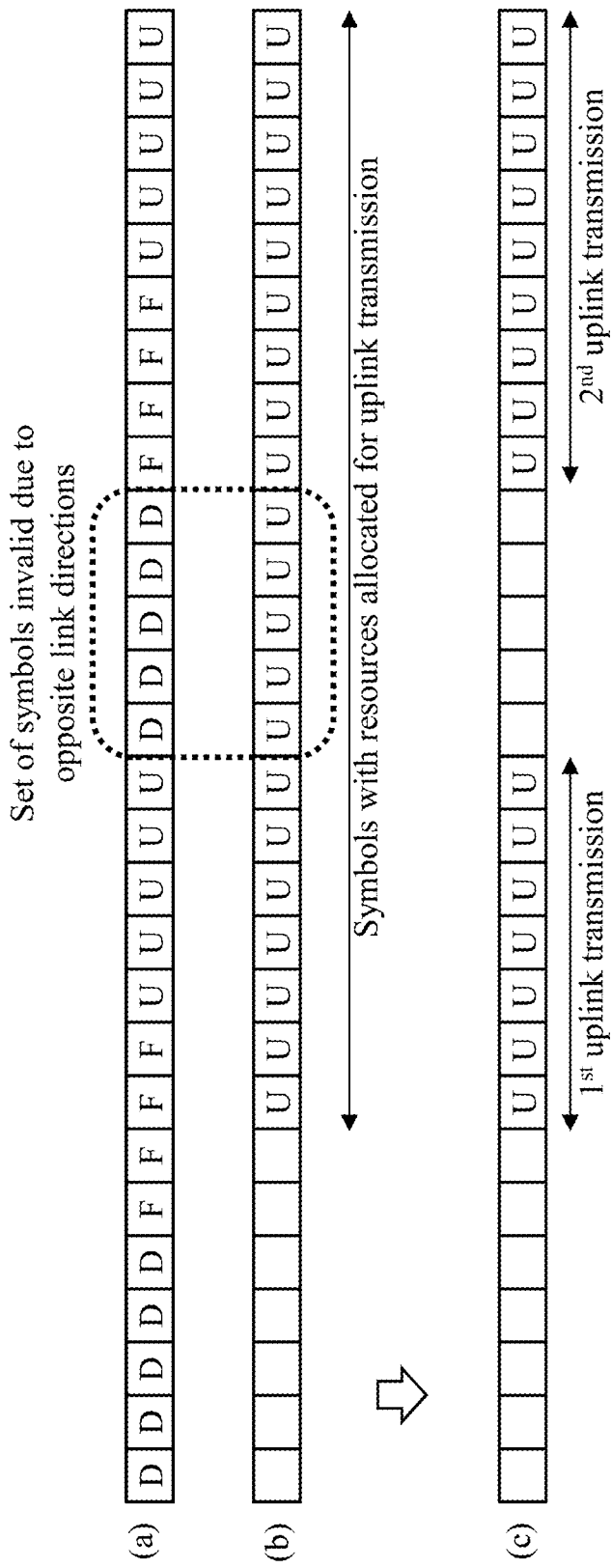
FIGS. 14 to 17 are diagrams illustrating examples of the present disclosure.

FIG. 13 is a diagram illustrating an exemplary UL-DL timing relationship.

A timing advance (TA) is a negative offset between the start of a received DL frame and the start of a transmitted UL frame at a UE. This offset is required to ensure synchronization between a DL frame and a UL frame at a BS. Referring to FIG. 13, for example, UL frame i is to be transmitted by the UE should start earlier than a corresponding DL frame by $T_{TA}=(N_{TA}+N_{TA,offset})*T_c$ where $T_c=1/(\Delta f_{max}*N_f)$, $\Delta f_{max}=480*10^3$ Hz, and $N_f=4096$. A TA offset $N_{TA,offset}$ depends on the duplex mode and frequency range (FR) of a cell in which the UL transmission takes place. The UE may be provided with a TA offset $N_{TA,offset}$ for a serving cell by n-TimingAdvanceOffset for the serving cell in serving higher-layer signaling (e.g., RRC signaling). When the UE is not provided with n-TimingAdvanceOffset for the serving cell, the UE may determine a default TA offset $N_{TA,offset}$ based on the following table.

TABLE 8

| Frequency range (FR) and band of cell used for uplink transmission | $N_{TA, offset}$ (Unit: $T_c$) |
|---|---|
| FR1 FDD band without LTE-NR coexistence case or FR1 TDD band without LTE-NR coexistence case | 25600 (Note 1) |
| FR1 FDD band with LTE-NR coexistence case | 0 (Note 1) |
| FR1 TDD band with LTE-NR coexistence case | 39936 (Note 1) |
| FR2 | 13792 |

(Note 1):
The UE identifies $N_{TA, offset}$ based on the information n-TimingAdvanceOffset. If UE is not provided with the information n-TimingAdvanceOffset, the default value of $N_{TA, offset}$ is set as 25600 for FR1 band. In case of multiple UL carriers in the same timing advance group (TAG), UE expects that the same value of n-TimingAdvanceOffset is provided for all the UL carriers and the value 39936 of $N_{TA, offset}$ can also be provided for a frequency division duplex (FDD) serving cell.

The BS may adjust a UL transmission timing for each UE by continuously measuring the timing of a UL signal from the UE and transmitting a TA $N_{TA}$ to the UE. The TA $N_{TA}$ for the PRACH may be set to 0.

In the following description, a TA basically refers to a timing advance value $N_{TA}$ between the DL and the UL. For DL-to-UL switching, however, the UE may need an additional time as well as the TA. For example, a UE which is not capable of supporting full-duplex communication and simultaneous transmission and reception to and from all cells of a cell group does not expect to transmit a UL signal in one cell of the group earlier than the end of the last DL symbol received in the same or different cell in the group by $T_{RX-TX}$. In another example, a UE which is not capable of full-duplex communication does not expect to transmit a UL signal earlier than the end of the last DL symbol received in the same cell by $T_{RX-TX}$. In these cases, the RX-to-TX transition time $T_{RX-TX}$ may be additionally considered for the TA. When the UE needs an additional time as well as the TA, for DL-to-UL switching, the TA may be $T_{TA}+T_{RX-TX}$ in the following description. The RX-to-TX transition time $T_{RX-TX}$ may be a time value obtained based on a minimum time from reception to transmission $N_{RT-TX}$. For example, $T_{RX-TX}=N_{RT-TX}*T_c$. The following table gives an exemplary transition time $N_{RX-TX}$.

TABLE 9

| Transition time | FR1 | FR2 |
|---|---|---|
| $N_{RX-TX}$ | 25600 | 13792 |

FIGS. 14 to 17 are diagrams illustrating examples of the present disclosure.

*Example 1

In the process of performing a UL transmission or DL reception in resources indicated or configured by the BS at the UE, when the slot format of some of symbols included in the resources allocated to the UE are opposite to that of the allocated resources (e.g., when a UL transmission is indicated for symbols indicated as DL by a semi-static DL/UL configuration or SFI DCI or when a DL transmission is indicated for symbols indicated as UL by a semi-static DL/UL configuration or SFI DCI), set(s) of the symbol(s) is excluded from the allocated resources. The UE performs one transmission/reception in each of sets of contiguous symbols configured with the remaining resources. In other words, the UE repeats the transmission/reception in the sets of contiguous symbols, with one transmission/reception in each set.

For example, a slot format may be configured/indicated by a semi-static DL/UL configuration or SFI DCI, as illustrated in FIG. 14(a). According to Example 1, when a UL transmission is indicated for some of the symbols illustrated in FIG. 14(a), as illustrated in FIG. 14(b), a set of symbols indicated as DL by the semi-static DL/UL configuration or the SFI DCI are excluded from resources allocated to the UE. As illustrated in FIG. 14(b), the UE may perform a UL transmission in each of sets of contiguous symbols separated from each other by the symbols excluded from the allocated resources (i.e., symbols which have the opposite link direction to that of resources allocated for the UL transmission based on the slot format indicated by the semi-static DL/UL configuration or the SFI DCI and thus which are invalid).

**Example 1-1

In the process of performing a UL transmission or DL reception in resources indicated or configured by the BS at the UE, when the BS expects that the UE will not have a sufficient time gap from the end of the last DL in consideration of the TA (and the RX-TX transition time) of the UE, the UE may skip a corresponding scheduled DL reception (e.g., CSI-RS measurement/reception, PDCCH monitoring, and SS/PBCH reception). While the BS performs the scheduled DL transmission, the UE does not receive the scheduled DL transmission in Example 1-1. In other words, the UE may form a guard period for DL-to-UL switching so that a UL transmission is possible all the time in given resources, and may not perform the DL reception in the guard period.

For example, let the end of a scheduled DL reception be denoted by $T_{DL}$ and a TA be denoted by $T_{TA}$. Then, in the presence of a UL transmission at time T satisfying $T_{DL}+T_{TA}>T$, the UE does not perform the DL reception.

Figure 15:
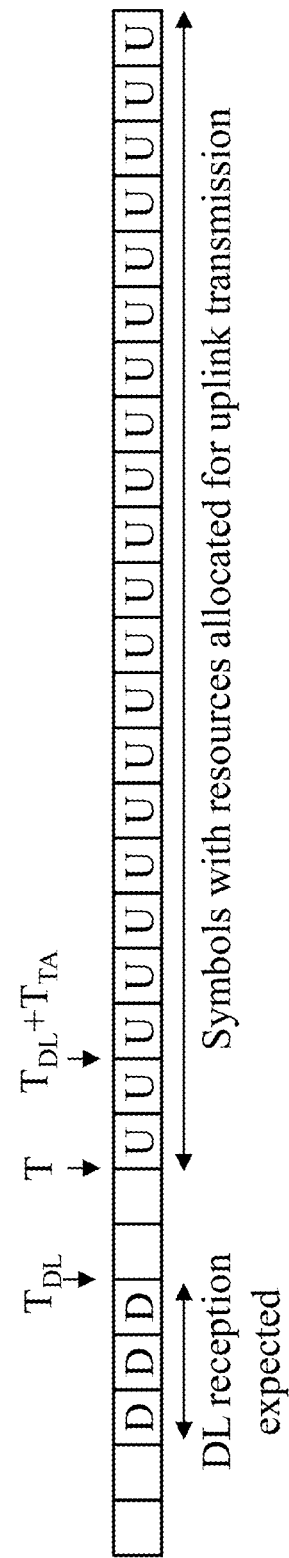

Referring to FIG. 15, it is assumed that a UL transmission is scheduled or triggered to start at time T. In FIG. 15, because time T is earlier than time $T_{DL}+T_{TA}$ which is a time point determined in consideration of a TA value $T_{TA}$ from the end $T_{DL}$ of a scheduled DL reception, the UE may not start the UL transmission at time T effectively. To effectively start the UL transmission at time T, the UE may not perform the DL reception at the end $T_{DL}$ of the last DL in Example 1-1.

**Example 1-2

In the process of performing a UL transmission or DL reception in resources indicated or configured by the BS at the UE, the BS may schedule or trigger the UL transmission in consideration of the TA and RX-TX transition time of the UE, such that the UE has a sufficient time gap from the end of the last DL. In other words, the UE may assume that as far as the UE excludes only DL symbol(s) from the transmission (see Example 1), the UE may always perform the UL transmission in resources given for the UL transmission, with no regard to the TA and RX-TX transition time of the UE.

*Example 2

Similarly to Example 1, when the UE performs one UL transmission or DL reception in each of sets of contiguous symbols, the UE may exclude (i.e., drop or omit) the UL transmission or DL reception in a specific set of contiguous symbols, considering the following conditions.

*Example 2-1

When the length of given contiguous symbols is less than or equal to a specific value L, that is, when the number of the given contiguous symbols is less than or equal to L (e.g., when the number of the given contiguous symbols is 1), the UE may not perform the UL transmission or the DL reception in the contiguous symbols, and the BS may also assume the same UE operation. L may be indicated to the UE by L1 signaling (e.g., DCI) from the BS, may be configured for the UE by a higher-layer parameter (e.g., an RRC parameter), or may be a predetermined value.

*Example 2-2

When the number/amount of resource elements (REs) used for a data transmission in contiguous symbols is not enough to transmit K bits, the UE may exclude the transmission. For example, when $M*N_{RE}<K$ where M is the modulation order of an MCS given for the data transmission, and $N_{RE}$ is the number of REs used for the data transmission, the UE may exclude the transmission. Example 2-2 is intended to ensure the transmission of systematic bits. Particularly, Example 2-2 may prevent performance degradation which may occur when resources for a transmission with redundancy version 0 (RV 0) do not include REs enough for a transport block size (TBS). In this regard, Example 2-2 may be applied differently according to an RV value. For example, only when the REs included in the resources for the transmission with RV0 are insufficient, the corresponding resources may be excluded, and the transmission with RV0 may be mapped to other resources.

In Example 2-2, the bit length K may be equal to a given TBS or may be obtained from the given TBS. For example, for a code rate C, $K=TBS*C^{-1}$. The code rate C may be a value obtained by applying an offset to an MCS index given by DCI, the largest value in a used MCS table (e.g., a table referred to, when an MCS index is indicated by DCI), a value configured by L1 signaling (e.g., DCI) or higher-layer signaling (e.g., RRC signaling) or a predetermined value.

*Example 2-3

When there is no sufficient time gap between the end of the last DL and the first of contiguous symbols used for a UL transmission, the UE may exclude the transmission. The sufficient time gap may be determined in consideration of the TA and/or the RX-TX transition time. For example, let the end of the last DL be denoted by $T_{DL}$ and the TA be denoted by $T_{TA}$. Then, when a UL transmission exists at time T satisfying $T_{DL}+T_{TA}>T$, the UE may exclude the UL transmission including time T.

Figure 16:
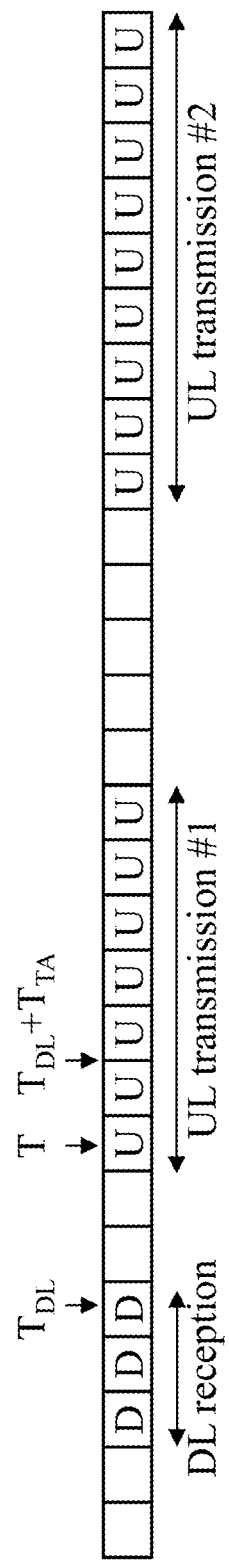

Referring to FIG. 16, it is assumed that a UL transmission is scheduled or triggered to start at time T. In FIG. 16, because time T is earlier than time $T_{DL}+T_{TA}$ which is a time point determined in consideration of a TA value $T_{TA}$ from the end $T_{DL}$ of a scheduled DL reception, the UE may omit UE transmission #1 in Example 2-3 because when the UE performs a DL reception until $T_{DL}$, the UE may not effectively start the UL transmission at time T.

*Example 3

Similarly to Example 1, in the process of a UL transmission or a DL reception in resources indicated or configured by the BS at the UE, when set(s) of symbols having an opposite slot format to that of allocated resources among symbols included in the allocated resources are excluded from the allocated resources, if the excluded symbol(s) is DL symbol(s) (in other words, the transmission direction indicated/configured to/for the UE is UL), the UE may exclude additional K symbols after the excluded last DL symbol from the transmission in order to ensure an RX-TX transition time and decrease interference to other UEs.

Particularly, the K symbols to be excluded (i.e., the K value) may be indicated to the UE by L1 signaling from the BS, may be configured for the UE by a higher-layer parameter, or may be determined in consideration of the TA and/or RX-TX transition time of the UE. For example, if a symbol duration corresponding to one symbol length used in the wireless communication system is $d_{symbol}$ and a TA is $T_{TA}$, K=ceil($T_{TA}/d_{symbol}$) where $d_{symbol}$ may be different according to a subcarrier spacing (SCS).

Figure 17:
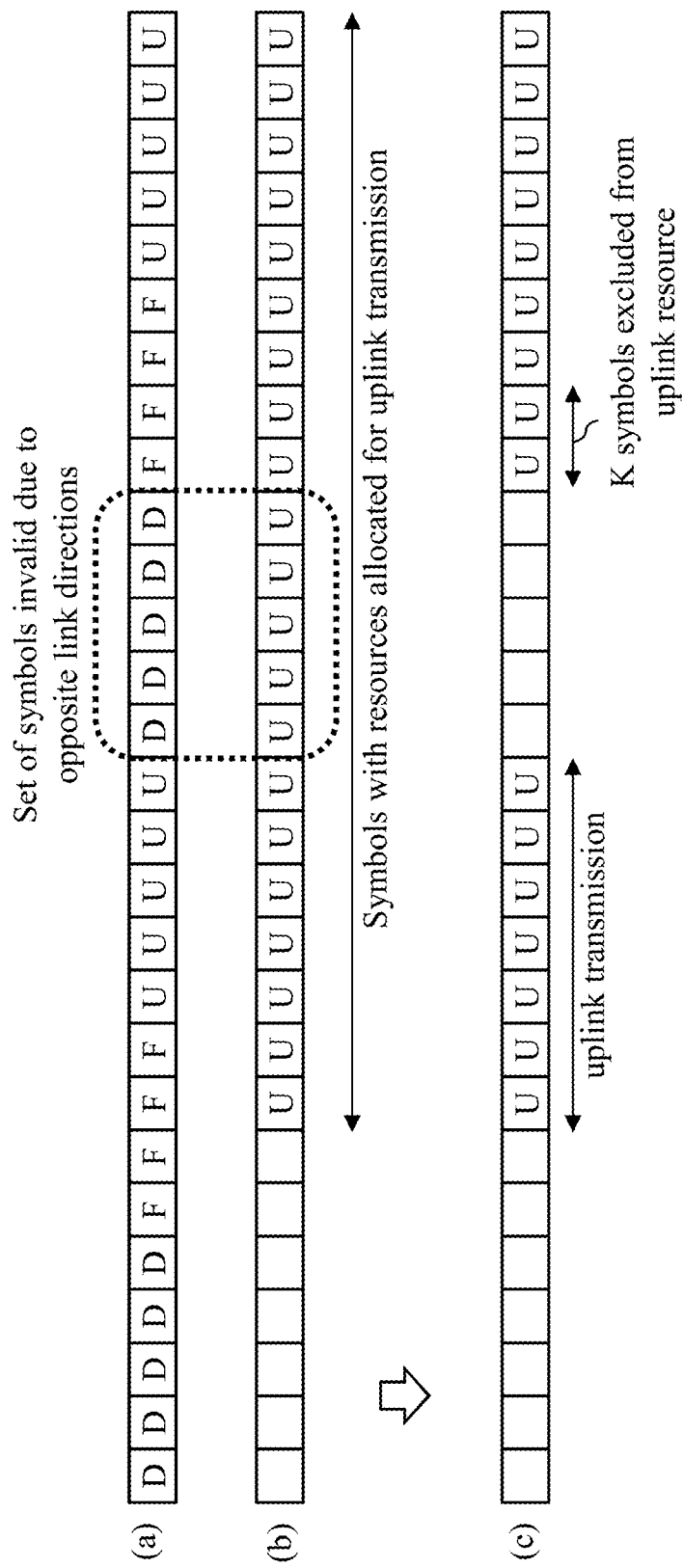

For example, a slot format may be configured/indicated by a semi-static DL/UL configuration or SFI DCI, as illustrated in FIG. 17 (a). According to Example 1, when a UL transmission is indicated for some of the symbols illustrated in FIG. 17 (a), as illustrated in FIG. 17 (b), a set of symbols indicated as DL by the semi-static DL/UL configuration or the SFI DCI among the symbols indicated for the UL transmission are excluded from the allocated resources. In Example 3, the UE additionally excludes K symbols following [4] 5 symbols excluded from the allocated resources in consideration of the TA (and/or the RX-TX transition time) of the UE. For example, when K=2, the UE may determine 2 symbols as invalid symbols as illustrated in FIG. 17 (c). The UE may perform the UL transmission in a set of the remaining contiguous symbols, considering the set of the remaining contiguous symbols as one transmission opportunity/occasion. As noted from FIGS. 15 (c) and 17 (c), the number of symbols determined as invalid by the UE is increased by K in Example 3, compared to Example 1.

In Example 3 (and Example 3-1 below), when there is any symbol (referred to collision symbol) having a transmission direction allocated/indicated by resource allocation information opposite to a slot format indicated by a semi-static DL/UL configuration or SFI DCI in a set of contiguous symbols, the UE/BS may determine the collision symbol as unavailable for an actual transmission and determine the remaining symbols except for the unavailable symbol as actual transmission resource(s) for PUSCH/PDSCH transmission(s).

*Example 3-1

Similarly to Example 1, in the process of a UL transmission or a DL reception in resources indicated or configured by the BS at the UE, when the UE excludes a set of specific symbols unavailable for the UL transmission (e.g., a set of symbols indicated as DL by a TDD-UL-DL configuration or DCI format 2_0) from allocated resources, the UE may exclude K additional symbols following a specific DL symbol in order to ensure an RX-TX witching time and decrease interference to other UEs.

The specific DL symbol may be at least one of the following symbols:

A symbol indicated as DL by TDD-UL-DL-ConfigCommon;

A symbol indicated as DL by TDD-UL-DL-ConfigDedicated;

A symbol indicated as DL by DCI format 2_0;

A DL or flexible symbol including an SS/PBCH. For example, a set of symbols in a slot, for receiving SS/PBCH blocks. The set of symbols for receiving the SS/PBCH blocks may be indicated by ssb-PositionsInBurst in SIB1 or PositionsInBurst in ServingCellConfigCommon. SIB1 or a parameter ssb-PositionsInBurst in the ServingCellConfig-Common IE for providing a common configuration of a serving cell provides a 4-bit, 8-bit, or 64-bit bitmap indicating the time-domain positions of SS blocks transmitted in a half-frame including SS/PBCH blocks. The bits of the bitmap are one-to-one mapped to 4, 8, or 64 SS/PBCH block indexes, such that the first/leftmost bit corresponds to SS/PBCH block index 0, the second bit corresponds to SS/PBCH block index 1, and the remaining bits correspond to the other SS/PBCH block indexes in this manner. In the bitmap, a value 0 indicates non-transmission of a corresponding SS/PBCH block, and a value 1 indicates transmission of the corresponding SS/PBCH block;

A DL or flexible symbol configured to transmit a Type0-PDCCH CSS set. For example, a set of symbols in a slot indicated to the UE by pdcch-ConfigSIB1 in the MIB, for a CORSET for the Type0-PDCCH CSS;

A DL or flexible symbol available for CSI-RS measurement;

A DL or flexible symbol including any type of PDCCH CSS set. For example, a set of symbols in a slot indicated to the UE by pdcch-ConfigSIB1 in the MIB, for any type of PDCCH CSS set;

A DL or flexible symbol including a PDCCH monitoring occasion;

A DL or flexible symbol to which a DL SPS PDSCH is allocated; and/or

A symbol including the end of the last DL, that is, a symbol shortly before the end of the last DL.

Particularly, the K symbols to be excluded (i.e., the K value) may be indicated to the UE by L1 signaling from the BS, may be configured for the UE by a higher-layer parameter, or may be determined in consideration of the TA and/or RX-TX transition time of the UE. For example, if a symbol duration corresponding to one symbol length used in the wireless communication system is $d_{symbol}$ and the TA is $T_{TA}$, K=Ceil($T_{TA}/d_{symbol}$) where $d_{symbol}$ may be different according to an SCS.

*Example 4

In the process of a UL transmission or a DL reception in resources indicated or configured by the BS at the UE, when the slot format of a set A of symbols included in resources allocated to the UE is opposite to that of the allocated resources (e.g., when a transmission in a direction opposite to a direction indicated for the set A of symbols by a semi-static DL/UL configuration or SFI DCI is indicated), the UE/BS may keep a set B of symbols in the allocated resources, excluding all of the remaining symbol(s) from the transmission. The UE performs one UL transmission or DL reception in the set B of symbols. For example, when there is any one collision symbol having a slot format opposite to the link direction of a transmission/reception among the symbols of resources scheduled for the transmission/reception, the UE keeps the set B of symbols, determining that the remaining symbols (including the collision symbol) are not actual transmission/reception resources, and performs the UL transmission or DL reception in the set B of symbols.

When a DL transmission is scheduled in allocated resources including the set A of symbols, the set B of symbols may be the first K symbols of the allocated resources. When a UL transmission is scheduled in the allocated resources, the set B of symbols may be the last K symbols of the allocated resources. K may be indicated to the UE by L1 signaling, configured for the UE by a higher-layer parameter, or determined in consideration of an MCS and a TBS related to the resources given (i.e., allocated) to the UE.

When a UL/DL transmission is scheduled for the UE and there is any one symbol indicated as DL/UL in the resources (by a semi-static DL/UL configuration or SFI DCI), the UE and the BS may exclude the remaining symbols from actual transmission resources, keeping only the set B of symbols enough to ensure a minimum code rate. For example, the UE may select a symbol length K (i.e., the number K of symbols) enough to ensure a specific code rate C in consideration of an MCS and a TBS given for the transmission/reception scheduled for the UE. The UE may perform the transmission/reception in the specific K ones of the symbols of the given resources based on the selected K value, and the BS may perform the corresponding reception/transmission, assuming that the UE operates in the same manner as described above. The UE may determine the symbol length K by $K*N_{RB}*M*C*N^{sc}_{RB} > TBS$ where $N^{sc}_{RB}$ is the number of subcarriers per RB, $N_{RB}$ is the number of allocated RBs, C is a given code rate, and M is a given modulation order. The code rate C and the modulation order M may be determined based on an MCS. In other words, when the UE receives resource allocation information from the BS, the UE may assume that the resource allocation information always ensures transmission of a specific bit length. The code rate C may be a value obtained from a given MCS index, a value obtained by applying an offset to the MCS index, the largest value in a used MCS table (a table referred to when an MCS index is indicated by DCI), a value given by L1 signaling (e.g., DCI) or higher-layer signaling (e.g., RRC signaling), or a predetermined value.

In another example, the UE may select a symbol length K enough for transmitting a given TBS in consideration of an MCS given for a transmission/reception scheduled for the UE. The UE may perform a UL transmission or a DL reception in the specific K ones of the symbols of the given resources based on the selected K value, and the BS may perform the UL reception or the DL transmission, assuming that the UE operates in the same manner as described above. The UE may determine the symbol length K by $K*N_{RB}*M*C*N^{sc}_{RB} > TBS$ where $N^{sc}_{RB}$ is the number of subcarriers per RB, $N_{RB}$ is the number of allocated RBs, and M is a given modulation order.

*Example 5

In the process of a UL transmission (Case 1) or a DL reception (Case 2) in resources indicated or configured by the BS at the UE, when the slot format of a set A of symbols included in resources allocated to the UE is opposite to that of the allocated resources (e.g., when a transmission in a direction opposite to a direction indicated for the set A of symbols by a semi-static DL/UL configuration or SFI DCI is indicated), the UE/BS does not expect that the DL reception (Case 1) or the UL transmission (Case 2) will be performed in a set B of symbols, which is at least a subset of the set A of symbols. Characteristically, the UE does not expect the DL reception (Case 1) such as PDCCH monitoring, PBCH/SS reception, and/or CSI-RS measurement or the UL transmission (Case 2) such as a configured grant, CSI reporting, and/or SRS transmission.

More specifically, the position (e.g., the duration and starting symbol) of the set B of symbols may be preset/predefined, configured by higher-layer signaling, indicated by L1 signaling, or determined based on the duration of the set A of symbols. Alternatively, the position of the set B of symbols may be determined in consideration of an MCS and a TBS which are associated with resources given to the UE. Alternatively, irrespective of whether Example 4 is applied, the position of the set B of symbols may be determined using the method of Example 4.

Example 5 may be used to guarantee the operation of Example 4. For example, in some scenarios of the present disclosure, Example 4 and Example 5 may be applied at the same time, so that when the BS indicates or configures a UL transmission or a DL reception to or for the UE, the UE may assume that the transmission or reception is possible in some symbol(s) of resources allocated for the transmission or reception irrespective of an existing slot format (e.g., a link direction indicated by a semi-static DL/UL configuration of SFI DCI).

*Example 6

When performing one UL transmission or one DL reception in each of sets of contiguous symbols, the UE may perform the transmission or the reception in other additional symbol(s) contiguous to specific contiguous symbol(s) along with the specific contiguous symbol(s) in consideration of a specific condition (Example 6-1 and/or Example 6-2). For example, when different transmission opportunities are contiguous in the time domain, the UE/BS may perform the UL transmission or the DL reception in symbol(s) which belongs to another transmission opportunity and is contiguous to a set C of contiguous symbols in one transmission opportunity, in addition to the set C of contiguous symbols. The transmission or reception scheduled for the corresponding contiguous symbol(s) may be performed additionally in the contiguous symbol(s) scheduled for another transmission/reception, while the other transmission/reception is not performed in the additional contiguous symbol(s). For example, a transmission/reception scheduled in the set A of contiguous symbols may be performed in the set A of contiguous symbols and the set B of symbols contiguous to the set A of contiguous symbols, while another transmission/reception scheduled in the set B of contiguous symbols may be omitted. In other words, in Example 6, the UE/BS may perform a transmission or a reception in more contiguous symbols by concatenating contiguous symbol(s) used for the transmission or the reception to other contiguous symbol(s) according to a certain condition (Example 6-1 and/or Example 6-2).

More specifically, the other contiguous transmission/reception may precede the specific contiguous symbol(s) in time. This method may be useful in reducing a latency because the UE/BS is allowed to first use larger time resources.

Alternatively, the other contiguous transmission/reception may follow the specific contiguous symbol(s) in time. This may method be useful in providing a sufficient processing time to the UE because the technique of Example 6 is enabled at a time when a condition allowing concatenation of contiguous symbols belonging to different transmission/reception opportunities is satisfied.

Alternatively, the other contiguous transmission/reception may be a contiguous transmission/reception opposite to the specific contiguous symbol(s) with respect to "a slot boundary close in time". Particularly, when the specific contiguous symbol(s) is adjacent to the slot boundary, the other contiguous transmission/reception may be a contiguous transmission/reception opposite to the specific contiguous symbol(s) with respect to the slot boundary.

Alternatively, the other contiguous transmission/reception may be a transmission/reception using more resources (e.g., resources including more REs or more symbols) among transmissions/receptions contiguous to the specific contiguous symbol(s). This may allow use of more resources in the time domain or more resources in terms of a total resource amount, thereby being helpful in reducing a latency.

*Example 6-1

When the length of given contiguous symbols is less than or equal to a specific value L, that is, when the number of the given contiguous symbols is less than or equal to L (e.g., when the number of the given contiguous symbols is 1), the UE may perform a UL transmission or a DL reception by concatenating the contiguous symbol(s) to a set of other contiguous symbols contiguous to the contiguous symbol(s), and the BS may also assume the same UE operation. L may be indicated to the UE by L1 signaling (e.g., DCI) from the BS, may be configured for the UE by a higher-layer parameter, or may be a predetermined value.

*Example 6-2

When the number/amount of REs used for a data transmission in contiguous symbols is not enough to transmit K bits (e.g., when $M*N_{RE}<K$ where M is the modulation order of an MCS given to the UE, and $N_{RE}$ is the number of REs), the UE may perform a UL transmission or a DL reception by concatenating the contiguous symbol(s) to a set of other contiguous symbols contiguous to the contiguous symbol(s), and the BS may also assume the same UE operation. This operation is intended to ensure transmission of systematic bit(s). Particularly, performance degradation may be prevented, which may occur when resources for a transmission with RV 0 do not include REs enough for a TBS. In this regard, Example 6-2 may be applied differently according to an RV value. For example, only when the REs included in the resources for the transmission with RV0 are insufficient for a data transmission with RV0, the corresponding transmission resources may be excluded, and the transmission with RV0 may be mapped to other transmission resources.

In Example 6-2, the bit length K may be equal to a given TBS or may be obtained from the given TBS. For example, for a code rate C, $K=TBS*C^{-1}$. The code rate C may be a value obtained by applying an offset to an MCS index given by DCI, the largest value in a used MCS table (e.g., a table referred to, when an MCS index is indicated by DCI), a value configured by L1 signaling (e.g., DCI) or higher-layer signaling (e.g., RRC signaling), or a predetermined value.

Figure 18:
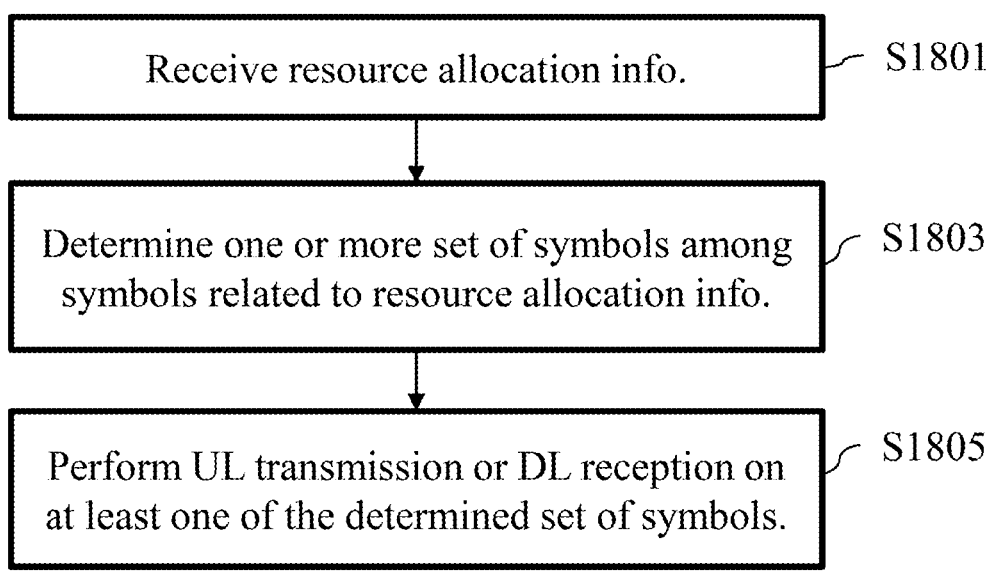
FIG. 18 is a flowchart illustrating an exemplary transmission operation according to some embodiments/implementations of the present disclosure.

FIG. 18 is a flowchart illustrating an exemplary transmission/reception operation according to some embodiments/implementations of the present disclosure.

A BS may transmit, to a UE, resource allocation information that schedules or triggers UL transmission(s) or DL transmission(s) (S1801). The resource allocation information may be information that schedules or triggers at least one UL transmission or at least one DL transmission to be performed in a plurality of symbols. As described before with reference to FIG. 12, the resource allocation information may be provided to the UE by a PDCCH or higher-layer signaling.

The UE may determine invalid symbol(s) having a slot format opposite to the link direction of the scheduled/triggered transmission based on the slot format of each of the plurality of symbols. The UE may determine one or more sets of contiguous symbols based on the remaining symbols except for the invalid symbol(s) among the plurality of symbols (S1803). The slot format may be indicated as UL, DL, or flexible by a semi-static TDD UL/DL configuration (e.g., TDD-UL-DL-ConfigCommon, TDD-UL-DL-ConfigDedicated, PositionInBurst, pdcch-ConfigSIB1, SPS-Config, and/or PDCCH-Config) or SFI DCI (e.g., DCI format 2_0). When the direction of the transmission scheduled/triggered by the resource allocation information is UL, the sets of contiguous symbols may include symbols with a slot format not indicated as DL (e.g., UL and/or flexible symbols). When the direction of the transmission scheduled/triggered by the resource allocation information is DL, the sets of contiguous symbols may include symbols with a slot format not indicated as UL (e.g., DL and/or flexible symbols).

According to one of examples of the present disclosure, the UE may perform the UL transmission or the DL reception scheduled/triggered by the resource allocation information in at least one of the determined sets of contiguous symbols (S1805). The UE may skip the transmission/reception in a set of a specific number of symbols with the same slot format as the transmission direction or flexible symbols according to one of examples of the present disclosure (see Example 2, Example 2-1, Example 2-2, and Example 2-3). Alternatively, the UE may perform the transmission/reception scheduled/triggered by the resource allocation information in the remaining symbols except for the specific number of symbols in the set of contiguous symbols according to any of the examples of the present disclosure (Example 3 and Example 3-1). Alternatively, the UE may perform the transmission/reception in symbol(s) contiguous to the set of contiguous symbols to be used for the transmission/reception in addition to the set of contiguous symbols according to any of the examples of the present disclosure.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

The implementations of the present disclosure may be used in a BS, a UE, or other equipment in a wireless communication system.

What is claimed is:

1. A method of performing, by a user equipment, an uplink transmission in a wireless communication system, the method comprising:
   receiving radio resource control (RRC) signaling including uplink-downlink (UL-DL) configuration information;
   determining each symbol as a downlink, uplink or flexible symbol based on the UL-DL configuration information;
   receiving downlink control information (DCI) that includes physical uplink shared channel (PUSCH) resource allocation information regarding a plurality of symbols for the uplink transmission;
   determining invalid symbols for the uplink transmission among the plurality of symbols, based on the UL-DL configuration information;
   determining remaining symbols except the invalid symbols as a plurality of valid symbols for the uplink transmission among the plurality of symbols; and
   performing the uplink transmission in each of symbol sets among multiple symbol sets,
   wherein determining the invalid symbols for the uplink transmission among the plurality of symbols, based on the UL-DL configuration information, comprises:
   determining a symbol that is indicated as downlink by the UL-DL configuration information as an invalid symbol for the uplink transmission,
   wherein each of the multiple symbol sets consists of one or more contiguous valid symbols within the plurality of valid symbols, and
   wherein performing the uplink transmission comprises:
   omitting the uplink transmission in a symbol set among the multiple symbol sets, based on the symbol set including a single symbol.

2. The method according to claim 1, further comprising:
   determining the multiple symbol sets within the plurality of valid symbols,
   wherein determining the multiple symbol sets within the plurality of valid symbols comprises:
   determining two symbol sets, each consisting of one or more contiguous valid symbols, based on contiguous valid symbols across a symbol boundary, wherein the contiguous valid symbols across the symbol boundary are divided into the two symbol sets based on the symbol boundary.

3. The method according to claim 1, wherein the UL-DL configuration information is not received via a physical downlink control information (PDCCH).

4. A user equipment for performing an uplink transmission in a wireless communication system, the user equipment comprising:
- at least one transceiver;
- at least one processor; and
- at least one memory storing at least one program that, when executed, causes the at least one processor to perform operations comprising:
- receiving radio resource control (RRC) signaling including uplink-downlink (UL-DL) configuration information;
- determining each symbol as a downlink, uplink or flexible symbol based on the UL-DL configuration information;
- receiving downlink control information (DCI) that includes physical uplink shared channel (PUSCH) resource allocation information regarding a plurality of symbols for the uplink transmission;
- determining invalid symbols for the uplink transmission among the plurality of symbols, based on the UL-DL configuration information;
- determining remaining symbols except the invalid symbols as a plurality of valid symbols for the uplink transmission among the plurality of symbols; and
- performing the uplink transmission in each of symbol sets among multiple symbol sets,
- wherein determining the invalid symbols for the uplink transmission among the plurality of symbols, based on the UL-DL configuration information, comprises:
- determining a symbol that is indicated as downlink by the UL-DL configuration information as an invalid symbol for the uplink transmission,
- wherein each of the multiple symbol sets consists of one or more contiguous valid symbols within the plurality of valid symbols, and
- wherein performing the uplink transmission comprises:
- omitting the uplink transmission in a symbol set among the multiple symbol sets, based on the symbol set including a single symbol.

5. A base station for performing an uplink reception in a wireless communication system, the base station comprising:
- at least one transceiver;
- at least one processor; and
- at least one memory storing at least one program that, when executed, causes the at least one processor to perform operations comprising:
- transmitting radio resource control (RRC) signaling including uplink-downlink (UL-DL) configuration information regarding downlink symbols, uplink symbols and flexible symbols;
- transmitting, to a user equipment, downlink control information (DCI) that includes physical uplink shared channel (PUSCH) resource allocation information regarding a plurality of symbols for the uplink reception;
- determining invalid symbols for the uplink reception among the plurality of symbols, based on the UL-DL configuration information;
- determining remaining symbols except the invalid symbols as a plurality of valid symbols for the uplink reception among the plurality of symbols; and
- performing the uplink reception in each of symbol sets among multiple symbol sets,
- wherein determining the invalid symbols for the uplink reception among the plurality of symbols, based on the UL-DL configuration information, comprises:
- determining a symbol that is indicated as downlink by the UL-DL configuration information as an invalid symbol for the uplink reception,
- wherein each of the multiple symbol sets consists of one or more contiguous valid symbols within the plurality of valid symbols, and
- wherein performing the uplink reception comprises:
- omitting the uplink reception in a symbol set among the multiple symbol sets, based on the symbol set including a single symbol.

* * * * *